(12) United States Patent
Driever et al.

(10) Patent No.: US 12,008,413 B2
(45) Date of Patent: Jun. 11, 2024

(54) VECTOR PROCESSING EMPLOYING BUFFER SUMMARY GROUPS

(71) Applicant: INTERNATIONAL BUSINESS MACHINES CORPORATION, Armonk, NY (US)

(72) Inventors: Peter Dana Driever, Poughkeepsie, NY (US); David Harold Surman, Milton, NY (US); Peter Kenneth Szwed, Rhinebeck, NY (US); Andrew Walter Piechowski, Lagrangeville, NY (US); Steven Neil Goss, Poughkeepsie, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 404 days.

(21) Appl. No.: 17/388,154

(22) Filed: Jul. 29, 2021

(65) Prior Publication Data

US 2023/0036467 A1 Feb. 2, 2023

(51) Int. Cl.
*G06F 9/50* (2006.01)

(52) U.S. Cl.
CPC ................. *G06F 9/5061* (2013.01)

(58) Field of Classification Search
CPC ............... G06F 9/5061; G06F 9/544
See application file for complete search history.

(56) References Cited

U.S. PATENT DOCUMENTS

| | | | |
|---|---|---|---|
| 5,390,328 | A | 2/1995 | Frey et al. |
| 5,479,615 | A | 12/1995 | Ishii et al. |
| 5,630,050 | A | 5/1997 | Neuhard et al. |
| 5,706,432 | A | 1/1998 | Elko et al. |
| 5,813,042 | A | 9/1998 | Campbell et al. |
| 6,813,726 | B2 | 11/2004 | Dahlen et al. |
| 7,013,305 | B2 | 3/2006 | Elko et al. |
| 7,257,091 | B2 | 8/2007 | Elko et al. |
| 9,043,643 | B2 | 5/2015 | Elko et al. |
| 9,565,013 | B2 | 2/2017 | Elko et al. |

(Continued)

FOREIGN PATENT DOCUMENTS

| | | |
|---|---|---|
| CN | 102523299 A | 6/2012 |
| CN | 104221000 A | 12/2014 |

(Continued)

OTHER PUBLICATIONS

Written Opinion of the International Searching Authority, PCT/IB2022/056107, Mar. 7, 2023, 4 pages.

(Continued)

*Primary Examiner* — Sisley N Kim

(74) *Attorney, Agent, or Firm* — Edward J. Wixted, III, Esq.; Blanche E. Schiller, Esq.; Heslin Rothenberg Farley & Mesiti P.C.

(57) ABSTRACT

A vector entry of a signaling vector is registered to a buffer summary group. The buffer summary group includes one or more summary indicators for one or more buffers assigned to the buffer summary group. A command is processed that sets a vector indicator in the vector entry and based on setting the vector indicator in the vector entry, a summary indicator of the one or more summary indicators is set in the buffer summary group.

25 Claims, 14 Drawing Sheets

(56) References Cited

U.S. PATENT DOCUMENTS

| | | | |
|---|---|---|---|
| 10,494,675 | B2 | 12/2019 | Kassis et al. |
| 10,713,166 | B2 | 7/2020 | Hagersten et al. |
| 2003/0099305 | A1 | 5/2003 | Yi |
| 2004/0230755 | A1 | 11/2004 | Check |
| 2006/0136458 | A1 | 6/2006 | Elko et al. |
| 2007/0240157 | A1 | 10/2007 | Herenyi et al. |
| 2008/0081628 | A1 | 4/2008 | Ye et al. |
| 2008/0240157 | A1 | 10/2008 | Muraguchi et al. |
| 2008/0291933 | A1 | 11/2008 | Cardona |
| 2009/0055590 | A1 | 2/2009 | Takahashi |
| 2012/0317312 | A1 | 12/2012 | Elko et al. |
| 2012/0331172 | A1 | 12/2012 | Mansur et al. |
| 2016/0103721 | A1* | 4/2016 | Driever .............. G06F 11/3466 714/37 |
| 2016/0320968 | A1 | 11/2016 | Okita |
| 2020/0125290 | A1 | 4/2020 | Shah et al. |
| 2020/0192805 | A1 | 6/2020 | Keymolen et al. |
| 2020/0348990 | A1* | 11/2020 | Katzenberger .... G06F 16/24568 |
| 2021/0219169 | A1 | 7/2021 | Ji |

FOREIGN PATENT DOCUMENTS

| | | |
|---|---|---|
| CN | 111694848 A | 9/2020 |
| TW | 200822638 A | 5/2008 |
| TW | 201843593 A | 12/2018 |

OTHER PUBLICATIONS

Kyne, Frank et al., "Coupling Facility Performance: A Real World Perspective," IBM, Mar. 2006, pp. 1-56.

Raften, David, "Coupling Facility Configuration Options," IBM, Oct. 2016, pp. 1-83.

Anonymous, "A Method and System for Providing a Dynamic Coupling Facility Resource Management," IP.com No. IPCOM000233570D, Dec. 15, 2013, pp. 1-4 (+ cover).

Anonymous, "Method and System for Determining an Error State of a Link to a Structured External Storage (SES) Facility in a Parallel Sysplex Environment," IP.com No. IPCOM000206043D, Apr. 12, 2011, p. 1 (+ cover).

Anonymous, "z/OS*—Have Hardware Report Instruction Usage to Help With Performance Evaluation and Code Coverage," IP.com No. IPCOM000179542D, Feb. 17, 2009, pp. 1-3 (+ cover).

Anonymous, "Method for the Alignment And Placement of Code Blocks to Improve ITLB Performance," IP.com No. IPCOM000146813D, Feb. 2007, pp. 1-6 (+ cover).

Anonymous, "Method and Apparatus for Handling Self Modifying Code in Dynamic Binary Translated Simulators," IP.com No. IPCOM000245170D, Feb. 16, 2016, pp. 1-6 (+ cover).

Betz, John W., et al., "Intersystem and Intrasystem Interference with Signal Imperfections," Apr. 2004, pp. 1-8.

Matveev, Victor et al., "Facilitation Through Buffer Saturation: Constraints on Endogenous Buffering Properties," Biophysical Journal, vol. 86, May 2004, pp. 2691-2709.

IBM, "z/Architecture—Principles of Operation," IBM Publication No. SA22-7832-12, Thirteenth Edition, Sep. 2019, pp. Jan. 2000.

Mell, Peter and Tim Grance, "The NIST Definition of Cloud Computing," National Institute of Standards and Technology, Information Technology Laboratory, Special Publication 800-145, Sep. 2011, pp. 1-7.

Driever, Peter Dana et al., "Intersystem Processing Employing Buffer Summary Groups," U.S. Appl. No. 17/388,127, filed Jul. 29, 2021, pp. 1-87.

List of IBM Patents or Patent Applications Treated as Related, Jul. 29, 2021, 2 pages.

PCT Notification of Transmittal of the International Search Report and the Written Opinion of the International Searching Authority, PCT/EP2022/070793, Dec. 13, 2022, 10 pages.

PCT Notification of Transmittal of the International Search Report and the Written Opinion of the International Searching Authority, PCT/IB2022/056107, Oct. 9, 2022, 10 pages.

* cited by examiner

BUFFERS

- ORIGINATOR BUFFERS ~310
- RECIPIENT BUFFERS ~320
- PRIMARY BUFFERS ~330
- SECONDARY BUFFERS ~340

FIG. 3

CHANNEL BUFFER SUMMARY RESPONSE AREA 400

ADDRESS X
404

| BYTE OFFSET | BUFFER SUMMARY GROUP# | ~402 |
|---|---|
| 0 | 0 |
| 256 | 1 |
| 512 | 2 |
| ... | ... |
| XXX | X |

FIG. 4A

BUFFER SUMMARY GROUP 402

| DWORD # | SUMMARY INDICATOR | |
|---|---|---|
| 0 | COMMAND ACTIVE SUMMARY | ~410 |
| 1 | SECONDARY ARRIVAL SUMMARY | ~412 |
| 2 | RESPONSE ACTIVE SUMMARY | ~414 |
| 3 | FINAL DATA ACTIVE/DATA READY SUMMARY | ~416 |
| 4 | PRIMARY COMPLETION SUMMARY | ~418 |
| ... | ... | |
| XX | .... | |

FIG. 4B

PREPARE CHANNEL BUFFER    500

SIGNAL CHANNEL BUFFER    510

LOCATE CHANNEL BUFFER    520

MOVE CHANNEL BUFFER
DATA MULTIPLE    530

TEST CHANNEL BUFFER    540

DEFINE VECTOR          600

TEST VECTOR ENTRIES    610

SET VECTOR ENTRY       620

REGISTER A VECTOR ENTRY OF A SIGNALING VECTOR TO A BUFFER SUMMARY GROUP ~800

THE BUFFER SUMMARY GROUP INCLUDES ONE OR MORE SUMMARY INDICATORS FOR ONE OR MORE BUFFERS ASSIGNED TO THE BUFFER SUMMARY GROUP ~802

PROCESS A COMMAND THAT SETS A VECTOR INDICATOR IN THE VECTOR ENTRY ~804

SET A SUMMARY INDICATOR OF THE ONE OR MORE SUMMARY INDICATORS IN THE BUFFER SUMMARY GROUP, BASED ON SETTING THE VECTOR INDICATOR IN THE VECTOR ENTRY ~806

THE REGISTERING INCLUDES USING A TEST VECTOR ENTRIES INSTRUCTION TO REGISTER THE VECTOR ENTRY TO THE BUFFER SUMMARY GROUP ~808

UNREGISTERING THE VECTOR ENTRY FROM THE BUFFER SUMMARY GROUP ~810

THE UNREGISTERING INCLUDES USING A SET VECTOR ENTRY INSTRUCTION TO UNREGISTER THE VECTOR ENTRY FROM THE BUFFER SUMMARY GROUP ~812

DEFINING THE SIGNALING VECTOR, THE SIGNALING VECTOR TO BE USED BY A COUPLING FACILITY OF THE COMPUTING ENVIRONMENT IN COMMUNICATION WITH ANOTHER COUPLING FACILITY OF THE COMPUTING ENVIRONMENT ~814

FIG. 8A

THE ONE OR MORE BUFFERS ASSIGNED TO THE BUFFER SUMMARY GROUP INCLUDE ONE OR MORE RECIPIENT SECONDARY BUFFERS USED BY ONE COUPLING FACILITY OF THE COMPUTING ENVIRONMENT TO RECEIVE COMMUNICATIONS FROM ANOTHER COUPLING FACILITY OF THE COMPUTING ENVIRONMENT — 820

ASSIGNING THE ONE OR MORE BUFFERS TO THE BUFFER SUMMARY GROUP — 822

ASSIGNING THE ONE OR MORE BUFFERS TO THE BUFFER SUMMARY GROUP INCLUDES USING A PREPARE CHANNEL BUFFER INSTRUCTION TO ASSIGN THE ONE OR MORE BUFFERS TO THE BUFFER SUMMARY GROUP — 824

THE PREPARE CHANNEL BUFFER INSTRUCTION IS EXECUTED PRIOR TO DEFINING THE SIGNALING VECTOR — 826

THE REGISTERING, PROCESSING AND SETTING ARE PERFORMED BY A COUPLING FACILITY OF THE COMPUTING ENVIRONMENT, THE COUPLING FACILITY TO FACILITATE COUPLING OF MULTIPLE PROCESSORS OF THE COMPUTING ENVIRONMENT — 828

FIG. 8B

VECTOR PROCESSING EMPLOYING BUFFER SUMMARY GROUPS

BACKGROUND

One or more aspects relate, in general, to facilitating processing within a computing environment, and in particular, to improving such processing.

Different computing environments provide different levels of reliability, accessibility and service. Further, computing environments may range from a single processor to multiple processors, from those supporting virtualization and/or partitioning to those having a simple design. Some computing environments with multiple processors and/or supporting partitioning may wish to share data and/or other facilities between the processors.

Computing environments that desire to share data and/or other facilities may use a coupling facility to facilitate the sharing. A coupling facility is, for instance, a shared storage device that includes multiple storage structures, such as cache, list and/or lock structures. It is a shareable facility having storage and processing capabilities provided by coupling facility control code, which may execute in its own logical partition accessible by other logical partitions and/or processors that wish to share data without a concern that the data will be corrupted. The other logical partitions and/or processors rely on the coupling facility to provide security, high-speed caching and/or locking facilities, as examples.

Since the coupling facility performs an important role in such computing environments, it is beneficial to facilitate processing of the coupling facility and/or to improve communication and processing speed between the processors and the coupling facility. In improving communication, it is beneficial to improve processing associated with buffers used in the communication.

SUMMARY

Shortcomings of the prior art are overcome, and additional advantages are provided through the provision of a computer program product for facilitating processing within a computing environment. The computer program product includes one or more computer readable storage media and program instructions collectively stored on the one or more computer readable storage media to perform a method. The method includes registering a vector entry of a signaling vector to a buffer summary group. The buffer summary group includes one or more summary indicators for one or more buffers assigned to the buffer summary group. A command is processed that sets a vector indicator in the vector entry and based on setting the vector indicator in the vector entry, a summary indicator of the one or more summary indicators is set in the buffer summary group.

Using the buffer summary group to indicate that a vector entry has been updated facilitates processing, reduces system resources and improves processing speed by reducing the number of instructions (e.g., architected instructions) to be executed to check the vector entry.

In one example, the registering includes using a test vector entries instruction to register the vector entry to the buffer summary group. Further, in one example, the vector entry is unregistered from the buffer summary group. The unregistering includes, for instance, using a set vector entry instruction to unregister the vector entry from the buffer summary group.

In one example, the signaling vector is defined, and the signaling vector is to be used by a coupling facility of the computing environment in communication with another coupling facility of the computing environment.

In one example, the one or more buffers assigned to the buffer summary group include one or more recipient secondary buffers used by one coupling facility of the computing environment to receive communications from another coupling facility of the computing environment.

In one example, the one or more buffers are assigned to the buffer summary group. The assigning includes, for instance, using a prepare channel buffer instruction to assign the one or more buffers to the buffer summary group. The prepare channel buffer instruction is executed, in one example, prior to defining the signaling vector.

As an example, the registering, processing and setting are performed by a coupling facility of the computing environment. The coupling facility is to facilitate coupling of multiple processors of the computing environment.

Computer-implemented methods and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

FIG. 3 depicts examples of buffers used in accordance with one or more aspects of the present invention;

FIG. 4A depicts one example of a channel buffer summary response area, in accordance with one or more aspects of the present invention;

FIG. 4B depicts one example of a buffer summary group of the channel buffer summary response area of FIG. 4A, in accordance with one or more aspects of the present invention;

FIGS. 8A-8B depict one example of facilitating processing within a computing environment, in accordance with one or more aspects of the present invention;

DETAILED DESCRIPTION

Figure 1A:
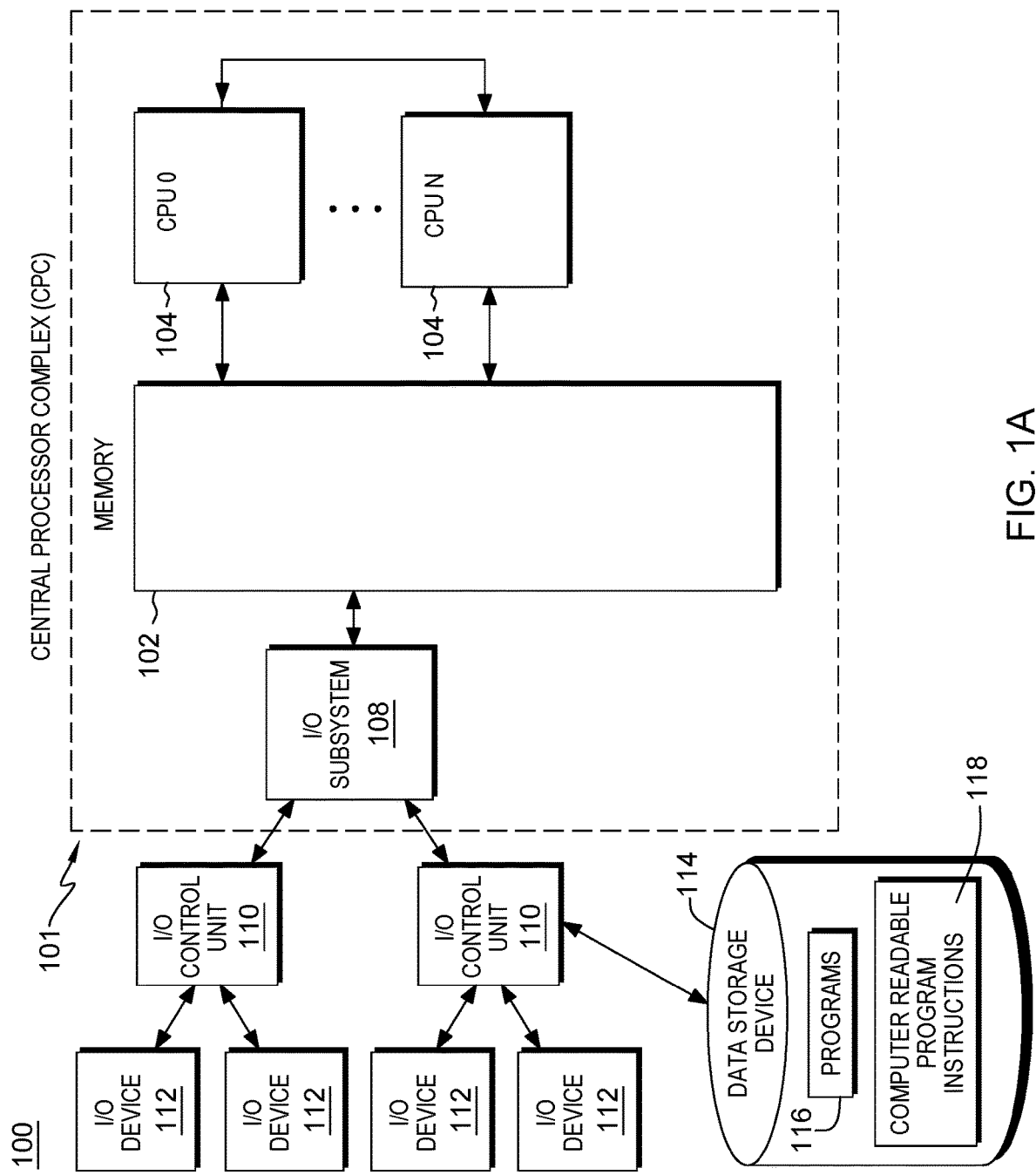
FIG. 1A depicts one example of a computing environment to incorporate and use one or more aspects of the present invention.

In accordance with one or more aspects of the present invention, a capability is provided to facilitate processing within a computing environment. As an example, a capability is provided to facilitate intersystem processing in computing environments employing one or more coupling facilities. The capability includes, for instance, defining, using and/or managing buffer summary groups to facilitate processing. In one aspect, the managing includes assigning buffers to buffer summary groups and/or dynamically adjusting the assigning of one or more buffers, such that the one or more buffers are reassigned from one or more buffer summary groups to one or more other buffer summary groups.

The buffers of a buffer summary group are used in communicating between processors and the coupling facility and/or between coupling facilities. The coupling facility (e.g., coupling facility control code) is provided the ability to segment buffers into groups which may be used to focus operations to particular groups of processors, since the processors are assigned select buffers to use. This provides a greater probability of having previously cached information available for the processors and reduces the amount of shared information. Caches are shared, in one example, by processors sharing buffer summary groups.

In one or more aspects, summary indications are provided within a buffer summary group to indicate the presence of events, such as buffer state changes, that may require the attention of the coupling facility, as an example. The buffer summary groups are provided, for instance, on cache line boundaries, which allows, e.g., the coupling facility control code the ability to limit processors servicing individual buffer summary groups to processors that closely share hardware facilities, maximizing the opportunity that the data will remain within local caches and improving performance.

In one or more other aspects, summary indications for registered vector state changes to specified buffer summary groups are provided. This facilitates processing between coupling facilities, as an example.

One embodiment of a computing environment to incorporate and use one or more aspects of the present invention is described with reference to FIG. 1A. As an example, the computing environment is based on the z/Architecture® instruction set architecture, offered by International Business Machines Corporation, Armonk, New York One embodiment of the z/Architecture instruction set architecture is described in a publication entitled, "z/Architecture Principles of Operation," IBM Publication No. SA22-7832-12, Thirteenth Edition, September 2019, which is hereby incorporated herein by reference in its entirety. The z/Architecture instruction set architecture, however, is only one example architecture; other architectures and/or other types of computing environments of International Business Machines Corporation and/or of other entities may include and/or use one or more aspects of the present invention. z/Architecture and IBM are trademarks or registered trademarks of International Business Machines Corporation in at least one jurisdiction.

Referring to FIG. 1A, in one example, a computing environment 100 includes a central processor complex (CPC) 101. Central processor complex 101 includes a plurality of components, such as, for instance, a memory 102 (a.k.a., system memory, main memory, main storage, central storage, storage) coupled to one or more processors, such as one or more general-purpose processors 104 (a.k.a., central processing units (CPUs)), and to an input/output (I/O) subsystem 108.

I/O subsystem 108 can be a part of the central processor complex or separate therefrom. It directs the flow of information between main storage 102 and input/output control units 110 and input/output (I/O) devices 112 coupled to the central processor complex.

Many types of I/O devices may be used. One particular type is a data storage device 114. Data storage device 114 can store one or more programs 116, one or more computer readable program instructions 118, and/or data, etc. The computer readable program instructions can be configured to carry out functions of embodiments of aspects of the invention.

Central processor complex 101 can include and/or be coupled to removable/non-removable, volatile/non-volatile computer system storage media. For example, it can include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with central processor complex 101. Examples include, but are not limited to: microcode or millicode, device drivers, redundant processing units, external disk drive arrays, RAID systems, tape drives, and data archival storage systems, etc.

Further, central processor complex 101 can be operational with numerous other general-purpose or special-purpose computing system environments or configurations. Examples of well-known computing systems, environments, and/or configurations that may be suitable for use with central processor complex 101 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1C:
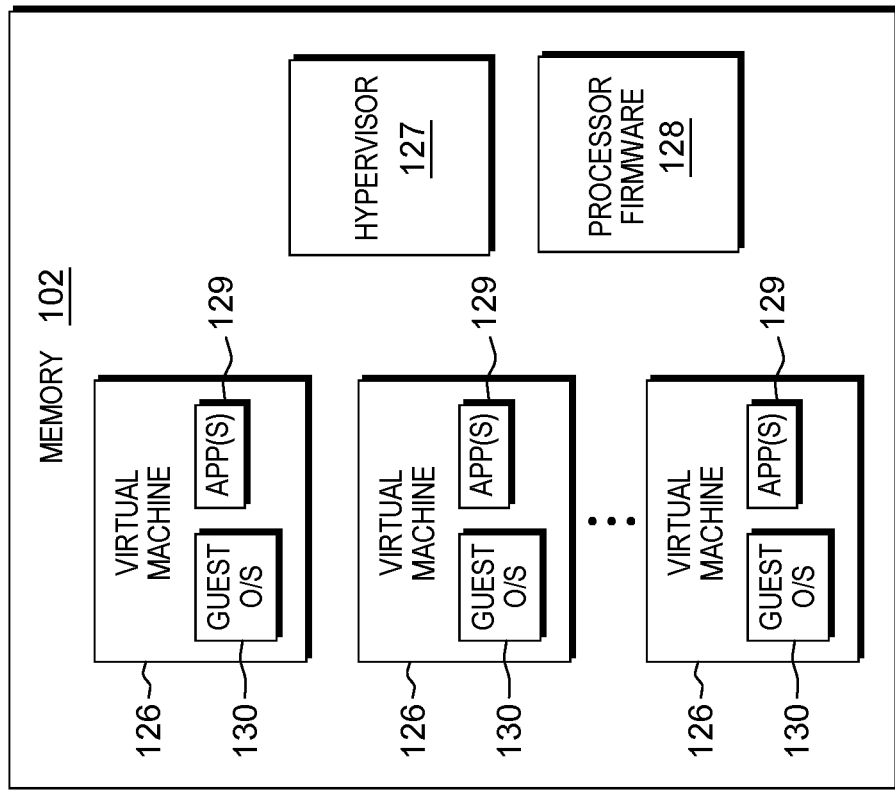
FIG. 1C depicts another example of further details of a memory of FIG. 1A, in accordance with one or more aspects of the present invention.
Figure 1B:
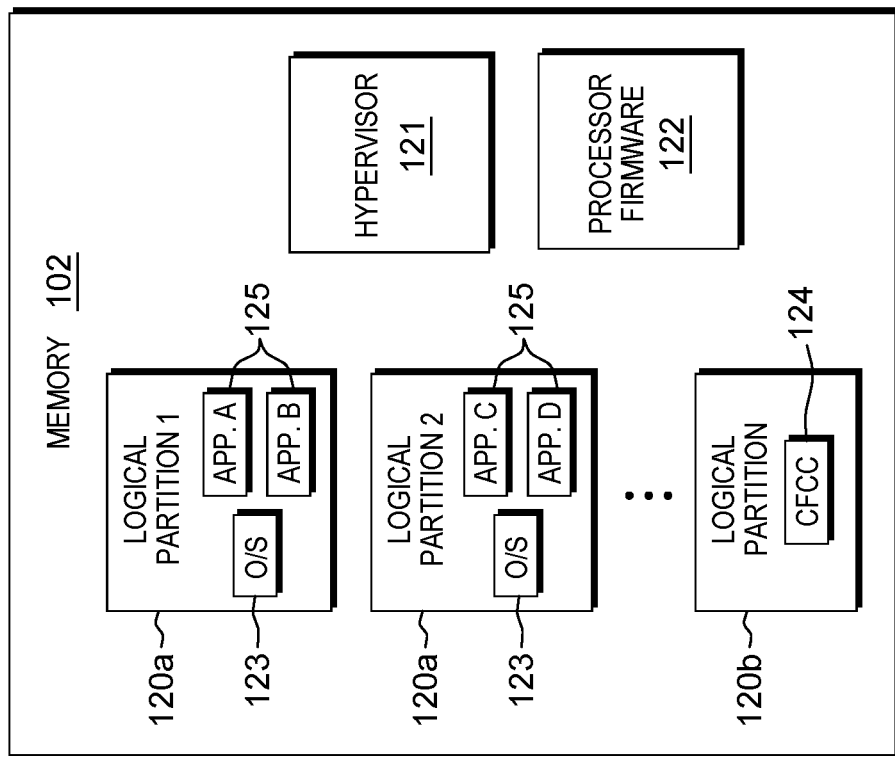
FIG. 1B depicts one example of further details of a memory of FIG. 1A, in accordance with one or more aspects of the present invention.

Central processor complex 101 provides in one or more embodiments logical partitioning and/or virtualization support. In one embodiment, as shown in FIG. 1B, memory 102 includes, for example, one or more logical partitions 120a, 120b; a hypervisor 121 that manages the logical partitions, and processor firmware 122. One example of hypervisor 121 is the Processor Resource/System Manager (PR/SM™), offered by International Business Machines Corporation, Armonk, New York PR/SM is a trademark or registered trademark of International Business Machines Corporation in at least one jurisdiction. Although PR/SM is provided as an example, other hypervisors may be used in accordance with one or more aspects of the present invention.

Processor firmware 122 includes, e.g., the microcode or millicode of a processor. It includes, for instance, the hardware-level instructions and/or data structures used in implementation of higher-level machine code. In one embodiment, it includes, for instance, proprietary code that is typically delivered as microcode or millicode that includes trusted software, microcode or millicode specific to the underlying hardware and controls operating system access to the system hardware.

Each logical partition 120a, 120b is capable of functioning as a separate system. That is, each logical partition can be independently reset and/or run a guest operating system 123, such as the z/OS® operating system, offered by International Business Machines Corporation, Armonk, New York, or other control code 124, such as coupling facility control code (CFCC) also offered by International Business Machines Corporation, Armonk, New York A logical partition 120a may operate with different programs 125. An operating system or application program running in a logical partition appears to have access to a full and complete system, but in reality, only a portion of it is available. Although the z/OS operating system and coupling facility control code are offered as examples, other operating systems and/or control code offered by International Business Machines Corporation and/or other companies may be used in accordance with one or more aspects of the present invention. z/OS is a trademark or registered trademark of International Business Machines Corporation in at least one jurisdiction.

As used herein, a logical partition running an operating system (e.g., logical partitions 120a) is referred to as a logical partition and a logical partition running coupling facility control code (e.g., logical partition 120b) is referred to as a coupling facility.

Memory 102 is coupled to, e.g., CPUs 104 (FIG. 1A), which are physical processor resources that can be allocated to the logical partitions and the coupling facility. For instance, a logical partition 120a includes one or more logical processors, each of which represents all or a share of a physical processor resource 104 that can be dynamically allocated to the logical partition. Coupling facility 120b may have one or more physical processors dedicated thereto.

In yet a further embodiment, the central processor complex provides virtual machine support (either with or without logical partitioning support). As shown in FIG. 1C, memory 102 of central processor complex 101 includes, for example, one or more virtual machines 126, a virtual machine manager, such as a hypervisor 127, that manages the virtual machines, and processor firmware 128. One example of hypervisor 127 is the z/VM® hypervisor, offered by International Business Machines Corporation, Armonk, New York. The hypervisor is sometimes referred to as a host. z/VM is a trademark or registered trademark of International Business Machines Corporation in at least one jurisdiction.

The virtual machine support of the central processor complex provides the ability to operate large numbers of virtual machines 126, each capable of operating with different programs 129 and running a guest operating system 130, such as the Linux® operating system. Each virtual machine 126 is capable of functioning as a separate system. That is, each virtual machine can be independently reset, run a guest operating system, and operate with different programs. An operating system or application program running in a virtual machine appears to have access to a full and complete system, but in reality, only a portion of it is available. Although z/VM and Linux are offered as examples, other virtual machine managers and/or operating systems may be used in accordance with one or more aspects of the present invention. The registered trademark Linux is used pursuant to a sublicense from the Linux Foundation, the exclusive licensee of Linus Torvalds, owner of the mark on a worldwide basis.

Figure 2A:
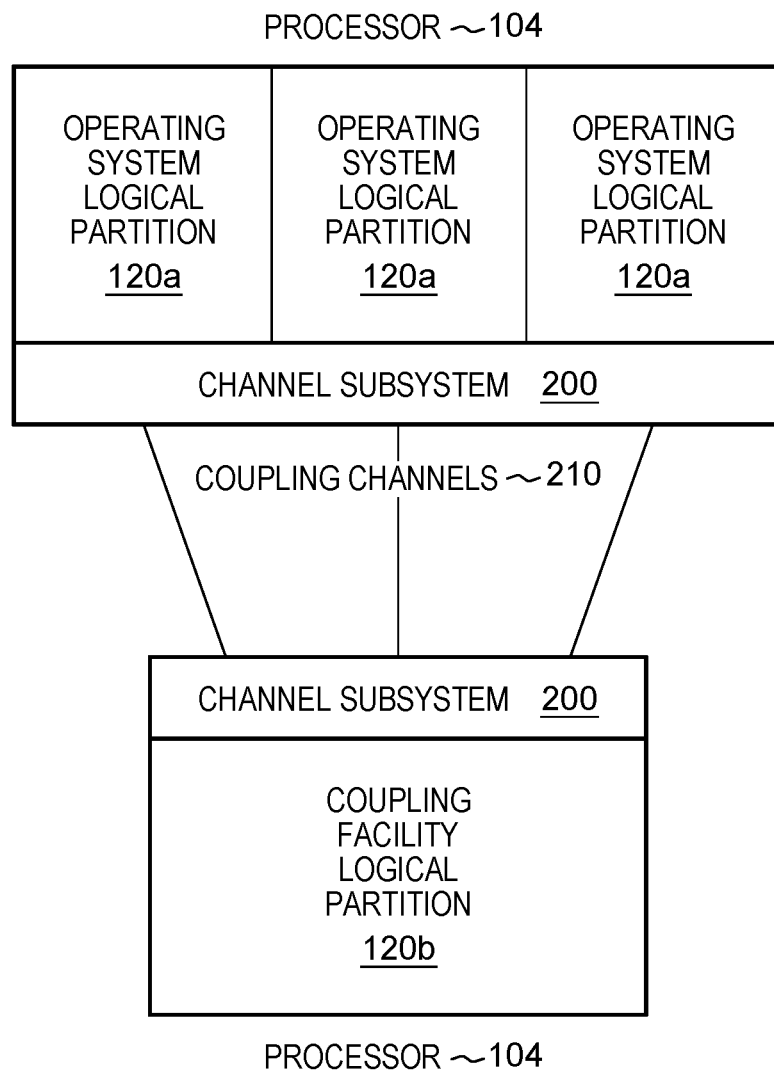
FIG. 2A depicts one example of a coupling between processors and a coupling facility, in accordance with one or more aspects of the present invention.

In one or more aspects, logical partitions 120a and coupling facility 120b are coupled to one another and messages are transmitted therebetween. Further details of communicating between logical partitions 120a and coupling facility 120b are described with reference to FIG. 2A. In one example, each logical partition 120a is coupled to coupling facility 120b via a channel subsystem 200 (which may be, e.g., a part of I/O subsystem 108). Channel subsystem 200 uses, at least, one or more coupling channels (also referred to as channels, intersystem channels or communication links) 210 to communicate between the logical partitions and coupling facility.

As one example, a logical partition communicates with a coupling facility over the coupling channels via, for instance, a Send Message (SMSG) protocol. An example of this communication is described with reference to FIG. 2B.

Figure 2B:
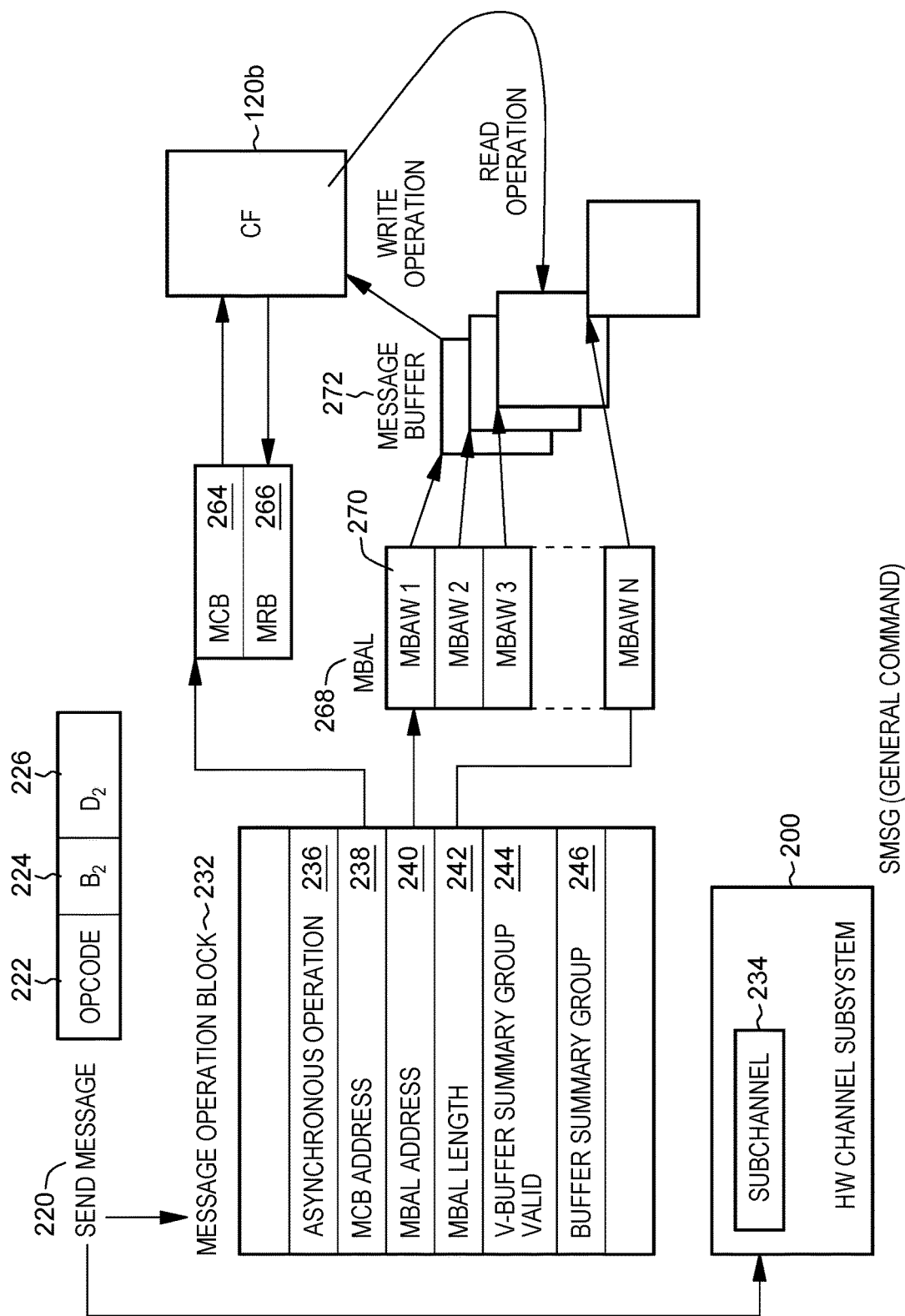
FIG. 2B depicts one example of using a Send Message instruction to communicate between a processor and a coupling facility, in accordance with one or more aspects of the present invention.

Referring to FIG. 2B, in one embodiment, a send message instruction 220 is used to send a message from a logical partition 120a to a coupling facility 120b. Send message instruction 220 includes, for instance, an operation code (opcode) field 222 specifying a send operation, a base field ($B_2$) 224 and a displacement field ($D_2$) 226. In one example, the contents of a register designated by $B_2$ field 224 added to the value in $D_2$ field 226 specify an address that indicates a location of a message operation block 232 to be used in sending a message. Send message instruction 220 also uses an implied register to designate, for instance, a subchannel 234 located in channel subsystem 200. Subchannels are dedicated to devices accessible to the channel subsystem and provide, for instance, storage to include information about the devices. Subchannels are used in communicating between a processor and a coupling facility and/or between coupling facilities.

One example of message operation block 232 for the Send Message instruction is described below. Although various fields are described, a message operation block may have additional, fewer and/or other fields. Further, although a field is set to a particular value, it may be set to another value. Additionally, a field described herein may be one size, but in other embodiments, it may be other sizes. Other variations are possible.

In one example, message operation block 232 includes, for instance:

Asynchronous operation (A) 236: This field, when set to one, indicates asynchronous execution of send message;

Message command block (MCB) address 238: This field points to a message command block (MCB) 264/ message response block (MRB) 266 pair. These are, for instance, 256-byte buffers located in, e.g., main memory. Message command block 264 includes one or more parameters that are sent to the coupling facility and when a response comes back, it is stored directly to message response block 266;

Message buffer address list (MBAL) address 240: This field points to a message buffer address list 268. The MBAL list is a variable length list from, e.g., 1 to 16. It includes one or more message buffer address words (MBAWs) 270 that designate one or more message buffers (also referred to as buffers herein) 272. The buffers may be a source for write operations to a coupling facility 120b or a target of read operations from the coupling facility;

MBAL length 242: This field indicates a length of the MBAL list. Not all commands have to have a message buffer address list, and therefore, the length could be zero;

V-Buffer summary group valid (V) indicator 244: This field, when set (e.g., to one), indicates a buffer summary group (BSG) value is valid. When this indicator is set, in one example, an asynchronous operation indication of the message operation block is to be set (e.g., to one); and Buffer summary group 246: This field represents an unsigned binary integer value indicating a buffer summary group to include summary indications which will indicate the message response block response has arrived to this Send Message operation.

In one embodiment, when Send Message is executed, parameters from the message operation block are passed to the CPU or channel subsystem requesting that a send function be performed with the coupling facility associated with a specified subchannel of the channel subsystem. The send function is performed synchronously or asynchronously to Send Message.

The send function is performed by using information in the subchannel to find a path to the coupling facility. Using the path, the message operation is forwarded to the coupling facility. For instance, execution of the message operation is accomplished by passing command information to the coupling facility, decoding and executing the command, formulating response information indicating the result, and storing the response information in the message response block.

In one embodiment, the send message instruction is part of a Message Facility, which is a system construct that provides a mechanism to communicate information between systems (physical or logical). The Message Facility uses the construct of a buffer (e.g., a channel buffer, a message buffer) to move information between systems. A buffer provides a facility to contain information which will be passed, as well as information as to the state of the operations used to pass the information between systems. The Message Facility provides multiple buffers, which are assigned to communication channels (e.g., coupling channels).

Buffers have a pre-defined characteristic of either being able to originate a transfer of information or to receive the request to process the information which is originated. For example, as shown in FIG. 3, example buffers include originator buffers 310, recipient buffers 320, primary buffers 330 and secondary buffers 340, each of which is described herein. Originator buffers 310 originate operations and may provide commands and send/receive data. Recipient buffers 320 receive information and allow for commands to be processed, receive/send data and send response information back to originator buffers. Originator and recipient buffers are assigned 1 to 1 in a logically connect pair. Primary buffers 330 and secondary buffers 340 are buffers used in communication between processors and coupling facilities and in, e.g., coupling facility to coupling facility communication.

Originator buffers have the following states of operation, as an example: idle—available to accept a command to send to a recipient buffer; busy—operation ongoing; and command response received and recognized. Recipient buffers have the following states of operation, as an example: idle—no command operation in progress; command received and recognized; data transfer completed; and response information returned to originator.

In accordance with one or more aspects of the present invention, a buffer may be assigned to a particular buffer summary group. In one example, the configuration (e.g., computing environment, central processor complex, etc.) is configured to include a plurality of buffer summary groups, and one or more of the buffer summary groups has one or more buffers assigned thereto. It is model-dependent how many buffer summary groups are supported, but in one example, there are up to 32 buffer summary groups. In other embodiments, there may be additional or fewer buffer summary groups. The buffer summary groups are allocated in a select location, which, in one example, is defined by and used by the coupling facility. For instance, as shown in FIG. 4A, the buffer summary groups are included in an area of memory, referred to herein as a channel buffer summary response area 400, and each buffer summary group 402 is at a selected offset 404 in the area. In one example, each buffer summary group is 256 bytes (e.g., one cache line) in size; however, in other embodiments, it may be other sizes.

In one example, channel buffer summary response area 400 is a block of storage whose starting address is defined by, e.g., a Prepare Channel Buffer instruction. The area includes, for instance, 32 consecutive sets of 256-byte areas numbered 0-31. Each 256 byte area is called a buffer summary group. Each group contains, for instance, a plurality of (e.g., five) summary double words, referred to herein as indicators.

Each indicator contains, for instance, a single bit indication (e.g., bit 0 of the double word) that specifies whether one or more associated events has occurred that was assigned to be indicated in that particular buffer summary group. In one example, the indicators are set by hardware and reset by the coupling facility. In other embodiments, they may be set and/or reset by other entities.

As an example, as shown in FIG. 4B, the indicators of a buffer summary group 402 include, for instance:

Command Active Summary 410: This indicator (e.g., bit 0 of word 0) of the buffer summary group is set by the system (e.g., processor architecture of the central processor complex) when an MCB arrives on a recipient primary buffer which has been registered to the particular summary group at Prepare Channel Buffer instruction time.

Secondary Arrival Summary 412: This indicator (e.g., bit 0 of word 2) of the buffer summary group is set by the system when an MCB arrives on a recipient secondary buffer which has been registered to the particular summary group and the particular byte of the vector which contains the vector bit to be set. This registration takes place at, e.g., Test Vector Entries instruction time.

Response Active Summary 414: This indicator (e.g., bit 0 of word 4) of the buffer summary group is set by the system when an MRB arrives or a status condition is detected on an originator secondary buffer which has been registered to the particular summary group at, e.g., Signal Channel Buffer instruction time.

Final Data Active/Data Ready Summary 416: This indicator (e.g., bit 0 of word 6) of the buffer summary group is set by the system when data active is set or data ready is set or a status condition is detected, as examples, at a primary recipient buffer which has been registered to the particular summary group at Prepare Channel Buffer instruction time.

In one example, channels which use the data active indication on write commands to the coupling facility will synchronously execute the Move Channel Buffer Data Multiple instruction, and therefore, indicate the final data active indication only in the buffer status area of a channel buffer operation block (CBOB) and not in the channel buffer summary response area.

A channel buffer operation block resides, for instance, in main storage and is created by a Prepare Channel Buffer instruction. The channel subsystem stores into the fields of the channel buffer operation block while performing message processor functions when the channel buffer is prepared. The program resets fields within the channel buffer operation block and outside the trace entry by, e.g., a Test Channel Buffer instruction.

In one example, there is a channel buffer operation block pair that includes an even-odd pair of channel buffer operation blocks, and when a receive function or a send secondary function is active for a channel buffer, the intersystem channel hardware stores into and fetches from the channel buffer operation pair.

Each channel buffer operation block of the pair includes, for instance, a message command block, a message response block, command active or response active indicator, a data active indicator, operation id, request field, status field and trace entry. In other embodiments, a channel buffer operation block may include additional, fewer and/or other information.

Primary Completion Summary 418: This indicator (e.g., bit 0 of word 8) of the buffer summary group is set by the system when an MRB arrives or a status condition is detected on an originator primary buffer which has been registered to the particular summary group at Send Message instruction time.

Additional, fewer and/or other indicators may be included in a buffer summary group.

As indicated herein, various system instructions are used to facilitate defining, registering and/or using the buffer summary groups and/or buffers assigned thereto. As examples, a Prepare Channel Buffer instruction is used to provide a configuration level definition of an address to contain the channel buffer summary response area and to provide preparation of individual channel buffers with a particular buffer summary group within the channel buffer summary response area; a Send Message (SMSG) instruction is used to provide an indication that a buffer summary group is used and to provide the specific group number; a Signal Channel Buffer (SCB) instruction is used to provide an indication that a buffer summary group is used and to provide the specific group number for completion summary (originator); a Locate Channel Buffer (LCB) instruction is used to recognize a command was received in a buffer (e.g., a recipient buffer), to limit the response of "work found" or "no work found" to particular groups, and to indicate for all groups, if selected; a Move Channel Buffer Data Multiple (MCBDM) instruction is used to indicate data immediately available or a need to re-execute the instruction after a summary arrives; a Define Vector instruction is used to define a coupling list notification vector; a Test Vector Entries instruction is used to request an indication to summary when the particular vector bit becomes active—register to a buffer summary group; and a Set Vector Entry instruction is used to define and provide vectors for state change indications across systems and to request a reset of a buffer summary group registration (de-register).

One or more of the instructions (e.g., Prepare Channel Buffer, Signal Channel Buffer, Locate Channel Buffer, Move Channel Buffer Data Multiple and Test Channel Buffer) use contents of a select register, such as general register 1, as an implied operand. In one example, select bits (e.g., bit 0 and bits 27-31) are used to indicate the use of a buffer summary group associated with the action invoked by the instruction. Use of those bits, if any, is described with reference to each of the instructions below. Further, in one example, select bits (e.g., bits 32-63) of general register 1 include a channel buffer token or control program token. A channel buffer token is provided to the control program and a control program token is provided by the control program when a channel buffer is prepared and persists until the channel buffer is subsequently prepared after having been unprepared or a system reset is performed.

One example of general register 1 that includes a channel buffer token is described below. As an example, it includes, for instance:

Validity (V): When this field (e.g., bit 0 of general register 1) is set to one for instructions that do not ignore, e.g., bits 0-31 of general register 1, the indicated buffer summary group is valid. Otherwise, bits 1-31 are ignored or reserved.

Buffer Summary Group (BSG): This field (e.g., bits 27-31 of general register 1) represents an unsigned binary integer indicating the buffer summary group number to be used for the instruction operation. If the validity indicator (V) is, e.g., 0, the value in this field is ignored. A valid value in this field is, e.g., 0-30; bit 31 and thus, the associated buffer summary group, are reserved, in one example.

Each of the instructions described herein may have one or more fields, and each field may have a particular size and/or location (e.g., certain bits of the instruction format). However, the fields, sizes and/or locations provided herein are just examples; additional, fewer and/or other fields, sizes and/or locations may be used. Further, each field may be set to a particular value; however, additional, fewer and/or other values may be used. Further, although various conditions and/or processing are described, additional, fewer and/or other conditions and/or processing may apply. Many variations are possible.

Figure 5A:
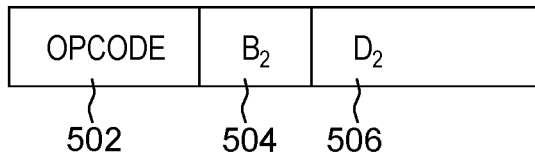
FIG. 5A depicts one example of a format of a Prepare Channel Buffer instruction, in accordance with one or more aspects of the present invention.

In one example, referring to FIG. 5A, a Prepare Channel Buffer instruction 500 includes an operation code field 502 to indicate a prepare channel buffer operation, a base field ($B_2$) 504 and a displacement field ($D_2$) 506. In one example, the contents of a register designated by $B_2$ field 504 added to the value in $D_2$ field 506 specify a second operand address, used as described below. In one example, the Prepare Channel Buffer instruction is executed by the coupling facility.

In operation, the Prepare Channel Buffer instruction performs one or more of the following operations, based on a request field in a designated channel buffer operation block:

The prepare function is performed synchronously to the execution of the instruction. As a result, the program influences, for the channel buffer, certain aspects of processing related to a secondary-send or receive function.

A trace entry in the channel buffer is copied to a channel trace area.

The multiprogramming request level (MPRL) for the link is stored in the channel buffer operation block.

The second operand address designates a message operation block. It is undefined whether the address is real or absolute.

When the resulting condition code is, e.g., zero, a channel buffer token is returned in select bits (e.g., 32-63) of a select register, e.g., general register 1.

In one example, a message operation block for a Prepare Channel Buffer instruction is, e.g., 64 bytes long, and includes the following, in one example:

Define Buffer-Summary Area (DBS): When this field (e.g., bit 6 of word 0), is, e.g., one, the channel buffer summary response area is defined for the configuration by using the channel buffer summary response area address, described below. This operation is to be performed prior to any Prepare Channel Buffer instruction resulting in condition code 0 can be executed.

Receive Function Type (R): When the R bit (e.g., bit 7 of word 0) is one, the channel buffer is prepared to participate in receive functions. When the R bit is zero, the channel buffer is prepared to participate in secondary-send functions.

Channel Subsystem Image Identifier (CSSID): This field (e.g., bits 8-15 of word 1) includes a channel subsystem image identifier.

Channel Path Identifier (CHPID): This field (e.g., bits 16-23 of word 1) includes a channel path identifier.

Channel Buffer Number (N): This field (e.g., bits 24-31 of word 1) includes a channel buffer number.

Channel Buffer Operation Block Address: This field (e.g., bits 0-63 of words 2-3) designates a location in storage of a channel buffer operation block pair. It is undefined whether the address is real or absolute.

Control program token: When the R bit is one, this field (e.g., bits 0-3 of word 6) includes a control program token that may be returned when a Locate Channel Buffer instruction completes with a condition code 0, as an example. A control program token of zero is invalid, in one example. When the R bit is zero, this field is reserved.

Buffer Summary Group: When the R bit is one, this field (e.g., bits 27-31 of word 7) includes an unsigned binary integer (e.g., 5 bits) representing the group offset into the base channel buffer summary response area. When an MCB arrives for this buffer, the command active summary bit for the indicated buffer summary group will be set to, e.g., one, and when conditions at the buffer cause the setting of the final data active/data ready, the associated bit for the indicated buffer summary group will be set to one. When the R bit is zero, this field is reserved.

Channel Buffer Summary Response Area Address (CBS@): When the DBS bit is, e.g., one, this field (e.g., bits 0-63 of words 8-9) includes the base address for the channel buffer summary response area for the configuration, in one example. This address is to be on, e.g., a 256-byte boundary. Prior to the first execution of a prepare instruction with the DBS bit set to, e.g., one, there will be no channel buffer summary response area available. Once successfully executed to establish the channel buffer summary response area address, the value is not to be changed until system reset is performed. When the R bit is zero or the DBS bit is zero, this field is reserved.

In operation, condition code, e.g., 3 is set and no other action is taken if any of the following conditions apply:

The channel buffer is not provided in the channel subsystem.

The channel buffer is not associated with a coupling facility channel.

The channel buffer is not available for selection.

As an example, condition code 2 is set and no other action is taken when the controls for the designated channel buffer are engaged in other system activity.

Bit 0 of the request field in the designated channel buffer operation block is the trace request bit. When the trace request bit is one, a trace request is recognized, and the trace entry in the channel buffer is copied to the channel trace area.

Bit 1 of the request field in the designated channel buffer operation block is the MPRL-request bit. When the MPRL-request bit is one, the effective message path request level for the link is placed into the MPRL area of the request field (e.g., bits 48-63 of the request field). The effective MPRL is the lower of the number of buffers on the message facility and coupling facility ends of the link. When link initialization has not completed, the MPRL is stored as zero.

When either or both the trace request or MPRL request bits are one, the instruction then completes by setting condition code, e.g., 1.

When both the trace request and MPRL request bits are, for instance, zero, the prepare function is performed, as described below.

Prepare function—If the channel buffer number is even and the channel buffer is idle, an even channel buffer operation block (CBOB) is prepared. If the channel buffer number is odd and the channel buffer is idle, then an odd channel buffer operation block is prepared. Additional requirements for the preparation of a CBOB are as follows, in one example:

On older models, if the channel buffer number is odd, then the corresponding even-numbered CBOB is to be in the prepared state.

On newer models, the following applies, in one example:

When the channel buffer number is even, and the corresponding odd-numbered channel buffer has already been prepared, then the CBOB address in the message operation block is to match the CBOB address used when preparing the odd-numbered buffer.

When the channel buffer number is odd, and the corresponding even numbered channel buffer has already been prepared, then the CBOB address in the message operation block is to match the CBOB address used when preparing the even-numbered buffer.

A define buffer summary area operation is to be done to define the channel buffer summary response area address prior to the prepare function for any channel buffer.

On completion of the channel buffer prepare function, a command active summary indicator in the buffer summary group assigned by the prepare function will be set to one. This provides initiative to perform an LCB instruction by the coupling facility control code and ensures any outstanding error state pending conditions are recognized and cleared.

When the channel buffer is already prepared and a change buffer summary group operation is performed, the command active summary indicator in the buffer summary group assigned by the prepare instruction will be set to one. This provides initiative to perform an LCB instruction by the coupling facility control code and ensures any outstanding error state pending conditions are recognized and cleared.

If the designated channel buffer is already prepared and the buffer summary group value has not changed since the previous prepare for this buffer, then condition code, e.g., 1 is set, and no other action is taken. If the designated channel buffer is already prepared and the buffer summary group value has changed since the previous Prepare Channel Buffer instruction for this buffer, the new buffer summary group value is placed at the channel buffer and condition code, e.g., 1 is set. Otherwise, the following occurs, in one embodiment:

A channel path and a channel buffer are assigned to the channel buffer operation block when it is prepared for receive or secondary-send functions.

Values from the message operation block are placed at the channel buffer.

The channel buffer enters the prepared state.

The channel buffer token is returned in, e.g., bits 32-63 of general register 1.

The instruction completes by setting condition code 0.

When the channel buffer enters the unprepared state, any assignment of channel path and channel buffer to the channel buffer operation block is revoked.

In one or more aspects, an operation exception is recognized when the central processor complex is operating in the basic mode. It is undefined whether or not an operand exception is recognized when a reserved field is nonzero or a control program token is zero.

A specification exception is recognized when any of the following occurs:

The define buffer summary area bit is set to one and:
the channel buffer summary response area address is not on, e.g., a 256-byte boundary or
the operation has already been performed for the configuration or
the channel buffer summary response area address (CBS@) value is zero or
the channel buffer summary response area address (CBS@) value plus, e.g., 8191 is beyond the storage within the configuration.

A channel buffer preparation function requested before a define buffer summary area operation has defined the channel buffer summary response area address for the configuration.

The buffer summary group value is invalid.

The second operand does not designate, e.g., a 64-byte boundary,

The channel buffer operation block address does not designate, e.g., a 8192-byte boundary, or Depending on the model, one of the following is true:
The channel buffer number is odd and the corresponding even-numbered CBOB is not in the prepared state.

Either of the following is true:
When preparing an even-numbered channel buffer, the corresponding odd-numbered channel buffer has already been prepared, and the CBOB address in the message operation block does not match the CBOB address used when preparing the odd-numbered buffer.

When preparing an odd-numbered channel buffer, the corresponding even-numbered channel buffer has already been prepared, and the CBOB address in the message operation block does not match the CBOB address used when preparing the even-numbered buffer.

Example Resulting Condition Codes include:
0 Channel buffer prepared or channel buffer summary response area address established
1 Channel buffer already prepared, trace request processed, or MPRL request processed, or buffer summary group reassigned
2 Busy
3 Not available In one or more aspects, the Prepare Channel Buffer instruction provides a configuration level definition of an address to contain the channel buffer summary response area. It uses a define buffer summary area operation to define the channel buffer summary response area address used to create a channel buffer summary response area. Further, the Prepare Channel Buffer instruction provides preparation of individual channel buffers with a particular buffer summary group within the channel buffer summary response area.

Figure 5B:
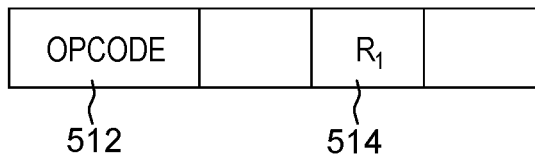
FIG. 5B depicts one example of a format of a Signal Channel Buffer instruction, in accordance with one or more aspects of the present invention.

Another instruction used in accordance with one or more aspects of the present invention is a Signal Channel Buffer instruction, an example of which is described with reference to FIG. 5B. In one example, a Signal Channel Buffer instruction 510 includes an operation code field 512 to specify a signal channel buffer operation and a register field (R$_1$) 514. Signal Channel Buffer is executed by the coupling facility, in one example.

In one example, the secondary-send function begins or the receive function completes synchronously to the execution of the instruction.

When the designated channel buffer is prepared to participate in secondary-send functions, the secondary-send function is initiated at the designated message device, the trace-request bit is tested, and the request field and response active control are reset.

When the designated channel buffer is prepared to participate in receive functions, the receive function is completed at the designated message device, the trace request bit is tested, and the request field and command active control are reset.

For the secondary-send function, select bits (e.g., bit 0 and bits 27-31) of general register 1, as an example, contain information on the buffer summary group to use for the operation.

For the receive function completion, select bits (e.g., bits 0-31) of general register 1, as an example, are ignored.

In one example, select bits (e.g., bits 32-63) of general register 1 contain the channel buffer token, which designates the channel buffer that is used. Further, general register $R_1$ contains a message operation word.

The control values contained in the message operation word are placed at the channel buffer, in one example.

When bit 0 of the request field is B' 1', a trace request is recognized and the trace entry in the channel buffer is copied to the channel trace area.

Condition code 0 is set when the actions outlined above have been taken.

In one example, the message operation word specifies whether or not a diagnostic time-out occurs for a secondary-send function, whether or not to discard the message response block, and the length of the block.

As an example, a message operation word includes the following:

Timeout (T): When the SCB (Signal Channel Buffer)-diagnostic timeout facility is installed, this field (e.g., bit 4) is the timeout control and operates as follows:

When this field is one, and the designated channel buffer is prepared to participate in secondary-send functions, a link timeout condition is recognized by the channel asynchronously to the execution of the Signal Channel Buffer instruction, but, e.g., immediately upon recognition of the secondary-send function by the channel.

When either this field is zero, or the designated channel buffer is prepared to participate in receive functions, link timeouts are not recognized due to the T control. Timeout conditions may still be recognized due to message frame protocols.

When the SCB-diagnostic-timeout facility is not installed, this field is reserved.

Discard Buffer (D): When this field (e.g., bit 5) is one and a message command block is sent, the message response block is discarded but the response active bit is still set.

The discard buffer bit is ignored when the designated channel buffer is prepared to participate in receive functions.

Length (L): This field (e.g., bits 24-31) specifies the length in words of the message command or message response block. A value of zero indicates a length of, e.g., 256 words.

If the transaction response size in the message command block is zero, then the length field is to contain a value between, e.g., 1 and 64. Otherwise, an operand exception may be recognized.

Receive function: In one example of a receive function, the channel buffer is placed in the idle state when no status condition is recognized while completing the function. Otherwise, the channel buffer is made status-pending, and it remains in that state until the status condition is cleared by, e.g., Test Channel Buffer or subsystem reset.

In one example, for a receive function, a channel buffer is assigned to participate in receive functions when the Prepare Channel Buffer instruction is executed. The channel subsystem initiates a receive function when a command signal arrives at the channel buffer and the channel buffer is not status pending. Performing the receive function includes taking the following actions, as examples: storing command information and any accompanying data in main storage; when the coupling related adapter interruptions for shared engines facility is installed and enabled, recognizing a coupling-related adapter event; suspending the receive function to permit command processing by the program; resuming the receive function and sending response information and any accompanying data; and recognizing status conditions.

Secondary-send function: In one example of a secondary-send function, the channel buffer is placed in the idle state when no status condition is recognized while performing the function. Otherwise, the channel buffer is made status-pending, and it remains in that state until the status condition is cleared by, e.g., Test Channel Buffer or subsystem reset.

When response active is set at the channel buffer, if the validity bit (e.g., bit 0) of general register 1 is set to one, the response-active summary bit in the channel buffer summary response area for the buffer summary group number defined in general register 1, e.g., bits 27-31, is also set to one.

In one or more aspects, the following conditions apply, as examples: Tests for special conditions are made during the execution of Signal Channel Buffer. When any special condition is recognized, the contents of the channel buffer are unchanged, and communication is not initiated with the device.

Condition code 1 is set and no other action is taken if the channel buffer is status pending when Signal Channel Buffer is executed or becomes status pending during the execution of the instruction.

Condition code 2 is set and no other action is taken when the channel buffer is neither command active, latent-retry pending, nor status pending and a receive function is requested or when the controls for the designated channel buffer are engaged in other system activity.

Condition code 3 is set and no other action is taken when the channel buffer is not prepared for secondary-send functions and a secondary-send function is requested, or is not prepared for receive functions and a receive function is requested.

Execution of Signal Channel Buffer is suppressed when any program-exception condition is recognized.

An operation exception is recognized when the central processor complex is operating in the basic mode.

A specification exception is recognized on a secondary-send function if, e.g., bit 0 of general register 1 is set to one and the buffer summary group value is invalid.

An operand exception may be recognized when a value is misspecified in general register $R_1$. The condition can be indicated even when the conditions associated with an access exception also exist.

It is undefined whether or not an operand exception is recognized when a reserved field is nonzero.

Example Resulting Condition Codes include:
0 Function initiated
1 Status-pending
2 Busy
3 Not prepared In one or more aspects, for a Signal Channel Buffer instruction, when response active is set at the channel buffer, if the validity bit in, e.g., general register 1 is set to, e.g., one, the response active summary bit in the channel buffer summary response area for the specified buffer summary group number is set to, e.g., one.

Figure 5C:
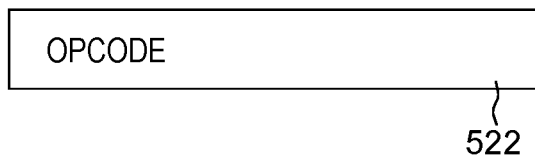
FIG. 5C depicts one example of a format of a Locate Channel Buffer instruction, in accordance with one or more aspects of the present invention.

Another instruction used by, for instance, the coupling facility is a Locate Channel Buffer instruction. In one example, referring to FIG. 5C, a Locate Channel Buffer instruction 520 includes an operation code field 522 indicating a locate channel buffer operation.

In one embodiment, when the message-path states of, e.g., all the channel buffers prepared for receive functions are not error-state-pending or when the message-path states of, e.g., all the channel buffers prepared for receive functions and command-active are not error-state-pending, a control-program token is returned in a select location (e.g., bits 32-63 of general register 1).

When the validity bit (e.g., bit 0) of general register 1 is set to one, the response of the instruction when condition code 0 is returned only applies to channel buffers previously prepared for receive functions and for the specified buffer summary group indicated by the value in, e.g., bits 27-31 of general register 1. When the validity bit is set to zero, the response applies to, e.g., all channel buffers previously prepared for receive functions, regardless of any buffer summary group assignment.

When none of the applicable channel buffers prepared for receive functions have received a command that has not been returned by, for instance, a Locate Channel Buffer, the control program token returned is zero.

When one or more of the applicable channel buffers prepared for receive functions has received a command that has not been returned by, for instance, a Locate Channel Buffer, and either
  the message time ordering facility is not installed, or
  the message time ordering facility is installed, and either
    the message time ordering bit in the message header is zero, or
    the message time ordering bit in the message header is one and the message time stamp in the message header is less than the value contained in, e.g., bits 32-55 of the processor's time-of-day (TOD) clock,
then the control program token associated with one of these channel buffers is returned.

Condition code 0 is set when the actions outlined above have been taken.

One or more special conditions may apply, as described below:

In one example, tests for special conditions are made during execution of Locate Channel Buffer. When any special condition is recognized, the contents of the channel buffer are unchanged.

Regardless of any buffer summary group association, condition code, e.g., 1 is set and no other action is taken if the message-path state associated with any channel buffer prepared for receive functions is error-state-pending or if the message-path state associated with any channel buffer prepared for receive functions and command-active is error-state-pending.

When the message time ordering facility is installed, the message time ordering bit in the message header is one, and the message time stamp in the message header is more than, e.g., one millisecond larger than the value contained in, e.g., bits 32-55 of the processor's TOD clock, then the sender and receiver's TOD clocks are considered to be sufficiently out of synchronization to preclude recovery by the message time ordering facility. In this case:
  a response time indication qualifier (RTIQ) is set to zero, and
  response code, e.g., 254 is returned to the sender with a status condition of, e.g., 16, indicating that the delay time is exceeded.

When the message time ordering facility is installed, the message time ordering bit in the message header is one, and the message time stamp in the message header is greater than or equal to the value contained in e.g., bits 32-55 of the processor's TOD clock, but the difference between these values is less than, e.g., one millisecond, then the message for the channel buffer is considered to be ineligible for LCB processing. In this case, the message remains pending in the channel buffer, and its token is not returned. Additionally, in this case, if no other buffer was available with an eligible command, condition code, e.g., 2 is set and general register 1 remains unchanged.

Example Resulting Condition Codes include:
 0 Control program token returned
 1 Error-state-pending
 2 Message-time-ordering delay
 3 --

Figure 5D:
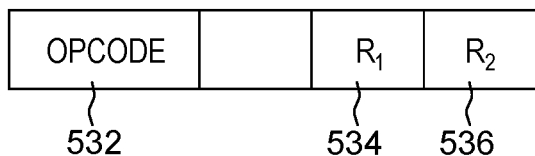
FIG. 5D depicts one example of a format of a Move Channel Buffer Data Multiple instruction, in accordance with one or more aspects of the present invention.

A further instruction to be used by the coupling facility is a Move Channel Buffer Data Multiple instruction. In one example, referring to FIG. 5D, a Move Channel Buffer Data Multiple instruction 530 includes an operation code field 532 to specify a move channel buffer data multiple operation, a first register field ($R_1$) 534 and a second register field ($R_2$) 536.

In one embodiment, the receive function is continued with the designated central processor complex device and is asynchronous to the execution of the instruction.

In one example, select bits (e.g., bits 0-31) of general register 1 are reserved and should contain zeros at instruction execution time. Bit 2 of general register 1, as an example, is used for response information from the instruction at instruction completion time when condition code, e.g., 2 is set.

The Move Channel Buffer Data Multiple instruction uses the buffer summary group set at the Prepare Channel Buffer instruction time for the buffer.

In one example, select bits (e.g., bits 32-63) of general register 1 contain the channel buffer token, which designates the channel buffer that is used.

Further, in one example, select bits (e.g., bits 32-63) of general register $R_1$ contain a message operation word, an example of which is described below. Also, select bits (e.g., bits 0-52) of general register $R_2$ padded with, e.g., 11 zeros on the right constitutes the main storage address of a message data element address list (MDEAL). It is undefined whether the main storage address is real or absolute.

In one example, the contents of general register $R_1$, select bits (e.g., bits 0-52) of general register $R_2$, and addresses of, e.g., all designated message data elements are placed at the channel buffer and the trace-request bit is tested. Data active and the request field are reset at the channel buffer.

When bit 0 of the request field is B' 1', a trace request is recognized and the trace entry in the channel buffer is copied to the channel trace area.

Condition code 0 is set when the actions described above have occurred.

A serialization and checkpoint synchronization function is performed before the operation begins. A checkpoint synchronization function may or may not be performed after the operation is completed.

In one example, a message operation word includes information on the size of a message data block, the number of message data blocks to be transferred, the size of the message data element, and the number of entries in the message data element address list. Also included is the direction to move the data.

As a particular example, a message operation word used by the instruction includes, for instance:
  Send Data (S): When this field (e.g., bit 0) is one, data is moved from storage to the channel buffer; when this field is zero, data is moved from the channel buffer to storage.
  Message Data Block Size (MBS): This field (e.g., bits 3-5) specifies the size of the message data block. The length in bytes is the product of, e.g., 256 and 2 raised to the power of the integer specified in the MBS field.

Transfer Count (TC): The value in this field (e.g., bits 11-15) specifies the number of message data blocks to be transferred.

Message Data Element Size (ES): This field (e.g., bits 19-21) specifies the size of the message data element. The length in bytes is, e.g., the product of 256 and 2 raised to the power of the integer specified in the ES field.

Message Data Element Address List Size (MDEALS): The value in this field (e.g., bits 23-31) specifies the number of entries in the message data element address list.

In one example, a message data element address list entry includes:

Main Storage Address (MSA): This field (e.g., bits 0 to (N-1) padded with (64-N) zeros on the right) specifies a main storage address on a boundary of the message data element size. It is undefined if the address is real or absolute.

In one example, the receive function continues if the channel buffer is command active and not status-pending. Data is transferred between the channel buffer and specified storage locations in the sequence of the addresses in MDEAL. Data is transferred on the link in the units of the message data block. The value in the TC field specifies the total number of message data blocks to be transferred.

When all of the data has been transferred, a final data active indication at the channel buffer is set to one, and the receive function is suspended.

When the MDEALS field or the TC field contains zero, the contents of the channel buffer and, e.g., all specified storage locations are unchanged, the final data active indication at the channel buffer is set to one, the condition code is set to zero, and the receive function is suspended.

In one example, the following conditions apply:

Tests for special conditions are made during execution of Move Channel Buffer Data Multiple. When any of the following special conditions is recognized, the contents of the channel buffer and, e.g., all specified storage locations are unchanged, and the receive function is not continued.

Condition code 1 is set and no other action is taken if the channel buffer is status-pending when Move Channel Buffer Data Multiple is executed.

Condition code 2 is set and no other action is taken when the channel buffer is:

neither command-active nor status-pending or when the controls for the designated channel buffer are engaged in other system activity.

or the MCBDM instruction cannot be completed until data is available at the channel buffer.

For the last case, above, in one example, bit 2 of general register 1 is also set to 1 as a response by the instruction.

Condition code 3 is set and no other action is taken when the channel buffer is not prepared for receive functions.

An operation exception is recognized when the central processor complex is operating in the basic mode or when the MCBDM facility is not installed, and the operation is suppressed.

An operand exception is optionally recognized when any reserved bit is nonzero or when any operand in the message operation word is invalid. When the exception is recognized, the operation is suppressed.

Example Resulting Condition Codes include:
0 Function initiated
1 Status-pending
2 Busy or not command-active
3 Not prepared In one or more aspects, the Move Channel Buffer Data Multiple instruction uses a data ready control to confirm if the receive function has completed receiving data. If it is still waiting for the data at the channel buffer, it will set a condition code of, e.g., 2, with bit 2 of general register 1, as an example, set to one. When the data is available, the data ready control is indicated in the channel buffer operation block. Re-execution of the MCBDM instruction completes with a condition code, e.g., 0 and moves the available data into program storage and the final data active indicator is set to, e.g., one in the channel buffer operation block. If the buffer was prepared with a buffer summary group at Prepare Channel Buffer instruction execution time, the summary indication bits are also set in the specified buffer summary group.

Figure 5E:
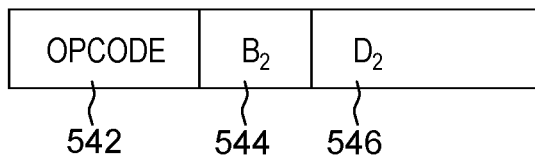
FIG. 5E depicts one example of a format of a Test Channel Buffer instruction, in accordance with one or more aspects of the present invention.

A further instruction to be used by the coupling facility is a Test Channel Buffer instruction. In one example, referring to FIG. 5E, a Test Channel Buffer instruction 540 includes an operation code field 542 to specify a test channel buffer operation, a base field ($B_2$) 544 and a displacement field ($D_2$) 546. In one example, the contents of a register designated by $B_2$ field 544 added to the value in $D_2$ field 546 specify an address that indicates a location of a message operation block.

In one example, a channel buffer information block is stored and when the channel buffer is prepared, the trace request bit is tested, and the activity controls, request field, and the status field in a channel buffer operation block are all reset.

As an example, select bits (e.g., bits 32-63) of general register 1 contain a channel buffer token, which designates the channel buffer that is used.

The second operand address designates a message operation block. It is undefined whether the address is real or absolute.

When bit 0 of the request field is B'1', a trace request is recognized and the trace entry in the channel buffer is copied to the channel trace area.

As an example, a message operation block for Test Channel Buffer is, e.g., 64 bytes long and includes, for instance:

Channel Buffer Information Block Address: Words 2 and 3, as an example, designate the location in storage of the channel buffer information block. It is undefined whether the address is real or absolute.

In one example, a channel buffer information block includes, for instance, a channel subsystem image identifier; a channel path identifier; a channel buffer number; a control program token; a channel buffer operation block pair address; a receive function type that indicates whether the channel buffer is prepared to participate in receive functions or send-secondary functions; an unprepared state that indicates whether the channel buffer is in an unprepared state; a command active control that, when set, indicates that a receive function has begun; a response active control that, when set, indicates that the secondary-send function continues; a data active control, described below; a request field; and a status field. Additional, fewer and/or other information may be included.

The data active control includes, for instance:

Final data active indicator that, when set, indicates that the receive function is suspended. When receiving data, the channel subsystem sets final data active at the channel buffer when the message data block is valid in main storage and it is the last message data block associated with the command. When sending data, the channel subsystem sets final data active at the channel buffer when the last message data block was sent successfully.

Data ready indicator that, when set, e.g., to one, indicates that, for channels, that require it, the receive function has completed receiving data and is ready to have the MCBDM executed to move the received data into program storage. The MCBDM will execute synchronously for these channels when this bit is set (e.g., to one). When receiving data, the channel subsystem sets data ready at the channel buffer when data associated with the active message is fully received and available to be moved to program storage by the MCBDM instruction. Channels that require this indication will present, e.g., a condition code 2 to the MCBDM instruction with, e.g., bit 2 of register 1 set to one if the data ready bit is set to, e.g., zero. When the program executes the MCBDM instruction to these channels and the data ready bit is set, e.g., to one, the MCBDM instruction will complete synchronously to the data availability in program storage with, e.g., condition code 0 and the final data active bit in the data active control for the channel buffer is set to, e.g., one.

In one embodiment, condition code 2 is set and no other action is taken when the controls for the designated channel buffer are engaged in other system activity.

Condition code 3 is set and no other action is taken when the channel buffer is not provided in the channel subsystem.

Execution of Test Channel Buffer is suppressed when any program-exception condition is recognized.

An operation exception is recognized when the central processor complex is operating in the basic mode.

An operand exception may be recognized when a value is misspecified in an operand. The condition can be indicated even when the conditions associated with an access exception also exist.

It is undefined whether or not an operand exception is recognized when a reserved field is nonzero.

A specification exception is recognized when the second operand or the channel buffer information block address does not designate, e.g., a 64-byte boundary.

Example Resulting Condition Codes include:
0 Channel buffer information block stored
1 --
2 Busy
3 Channel buffer not provided In addition to the instructions provided to use the Message Facility, other instructions are provided to define and provide vectors for state changes across systems. These instructions are defined, in accordance with one or more aspects of the present invention, to use one or more buffer summary groups. For instance, vectors used in coupling facility to coupling facility communication signaling are registered to one or more buffer summary groups and indicators within the buffer summary groups are used to indicate vector state changes. In one example, recipient secondary buffers are used for buffer summary group signaling for vector state changes. The firmware provides vector change processing on, e.g., arrival of a message command.

Figure 6A:
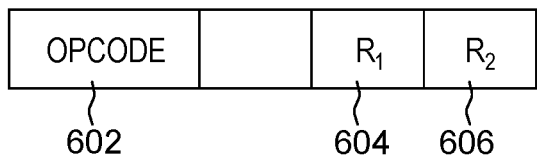
FIG. 6A depicts one example of a format of a Define Vector instruction, in accordance with one or more aspects of the present invention.

One example of an instruction used in vector processing by, e.g., the coupling facility is a Define Vector instruction. In one example, referring to FIG. 6A, a Define Vector instruction 600 includes an operation code field 602 specifying a define vector operation, a first register field ($R_1$) 604 and a second register field ($R_2$) 606.

In one example, a function is performed on a message vector, as specified by, e.g., the value in select bits (e.g., bits 32-63) of general register 1:

| Hex Value | Function Performed |
|---|---|
| 0000 0000 | Define local cache vector |
| 0000 0001 | Define list notification vector |
| 0000 0002 | Release vector |
| 0000 0003 | Clear vector |
| 0000 0004 | Modify vector |
| 0000 0005 | Define Coupling Facility Signaling Vector |

Bits 16-23 of the instruction are ignored, in one example.

In one embodiment, the $R_1$ field specifies an even-numbered register of an even-odd pair of general registers. The registers contain a local cache token (LCT) or a list notification token (LNT) for a release, clear, or modify function. A list notification token or local cache token is loaded into the registers by the CPU for a define function. Bits 0-31 of the local cache token or list notification token are loaded in, e.g., bits 32-63 of register $R_1$ and, in one example, bits 32-63 of the local cache token or list notification token are loaded in, e.g., bits 32-63 of register $R_1+1$.

The $R_2$ field specifies a general register that is used for a define or modify function. The field is ignored for the other functions.

For a define or modify function, $R_2$ contains, e.g., a 32-bit unsigned binary integer in select bits (e.g., bits 32-63) of the register indicating the number of vector entries requested by the program. The value in the register indicates the number of entries assigned (NBVE) when, e.g., condition code 0 or 1 is set by the instruction. NBVE is a multiple of 32, in one example.

In one example, serialization is performed before the operation begins and again after it is completed.

Further details relating to each of the functions are described below:

Define Local Cache Vector: A local cache vector and its vector token are assigned. The vector entries are all zero, in one example.

Define List Notification Vector: A list notification vector and its vector token are assigned. The vector entries and the local summary indicator for the vector are all zero, in one example.

Release Vector: The local cache token or list notification token becomes not assigned.

Clear Vector: The entries of the message vector are reset to zeros. The local summary, if any, is unchanged.

Modify Vector: The message vector is expanded or contracted from its highest-numbered entry to reach a length of NBVE entries. Entries existing before expansion are unchanged; new entries are zeros. Entries remaining after contraction are unchanged. The vector token is unchanged.

Define Coupling Facility Signaling Vector: A list notification vector for use by the coupling facility and its vector token are assigned. The vector entries and the local summary indicator for the vector are all zero, in one example.

The coupling facility signaling vector provides the additional ability to register and un-register vector entries to particular buffer summary groups. Define coupling facility signaling vector causes the system facilities for these registrations to be initialized to an inactive state (no registrations).

In one example, a single coupling facility signaling vector is defined within the configuration. The release vector function of the Define Vector instruction can be performed on a list notification token (LNT) representing a coupling facility signaling vector. A Prepare Channel Buffer instruction defining the channel buffer summary response area address is to be executed prior to defining the coupling facility signaling vector.

The maximum value for NBVE in, e.g., bits 32-63 of general register $R_2$ is a model-dependent value for the coupling facility signaling vector.

One or more special conditions may apply.

Condition code 1 is set if the requested number of entries was not assigned, but was reduced to the number indicated in register $R_2$. Condition code 1 is set, e.g, only for a define or modify function.

Condition code 2 is set and no other action is taken if no space is available for defining or expanding a vector or no new token is available. It is set, e.g., for a define or modify function.

Condition code 3 is set and no other action is taken if the token specified for a release, clear, or modify function is not assigned. Condition code 3 takes precedence over condition code 2, in one example.

A specification exception is recognized when $R_1$ is odd or zero, $R_2$ is zero, or the value in, e.g., bits 32-63 of general register 1 exceeds, e.g., 4 hex for an operating system partition or, e.g., 5 hex for a coupling facility partition.

A specification exception is recognized when the value in, e.g., bits 32-63 of register $R_2$:
is zero for any define vector function or modify function
or
greater than the model-dependent maximum for a define coupling facility signaling vector function.

A specification exception is recognized if a LNT representing a coupling facility signaling vector is provided:
and the function requested is a clear vector or modify vector, or
the function requested is define coupling facility signaling vector and a coupling facility signaling vector has previously been defined, or
the function requested is define coupling facility signaling vector and a Prepare Channel Buffer instruction defining the channel buffer summary response area address was not previously executed.

Resulting Condition Codes include, for instance:
0 Function performed
1 Number of entries fewer than requested
2 Vector space or token unavailable
3 LCT/LNT not assigned In one or more aspects, the Define Vector instruction defines a coupling facility signaling vector. As an example, a list notification vector and its vector token are assigned for use by the coupling facility. In one example, a Prepare Channel Buffer instruction is executed prior to defining the coupling facility signaling vector.

Figure 6B:
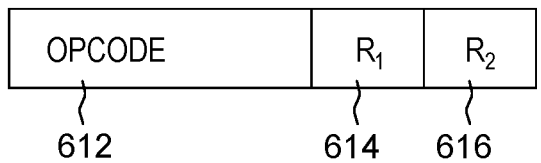
FIG. 6B depicts one example of a format of a Test Vector Entries instruction, in accordance with one or more aspects of the present invention.

Another vector instruction to be executed by the coupling facility is a Test Vector Entries instruction. In one example, referring to FIG. 6B a Test Vector Entries instruction 610 includes an operation code 612 indicating a test vector entries operation, a first register field ($R_1$) 614 and a second register field ($R_2$) 616.

In one example, a test is performed on one or more message vector entries, as specified by the value in, e.g., bits 32-63 of general register 1:

| Hex Value | Function Performed |
|---|---|
| 0000 0000 | Test entry |
| 0000 0001 | Load and test entries |

The $R_1$ field specifies an even-numbered register of an even-odd pair of general registers. The registers contain a local cache token (LCT) or a list notification token (LNT). In one example, bits 0-31 of the local cache token or list notification token are contained in, e.g., bits 32-63 of register $R_1$ and select bits (e.g., bits 32-63) of the local cache token or list notification token are contained in, e.g., bits 32-63 of register $R_1$+1.

The $R_2$ field specifies an even-numbered register of an even-odd pair of general registers. Register $R_2$ contains a local cache entry number (LCEN) or list notification entry number (LNEN). With the LCT or LNT, the entry number designates a vector entry.

Bits 16-23 of the instruction are ignored, in one example.

When a LNT token is contained in general register $R_1$ and $R_1$+1 specifies a coupling facility signaling vector and the test entry function of the instruction is specified, bit 0 of general register 1, when set to one, indicates that the byte containing the indicated vector entry is to be registered for a buffer summary group. In one example, bits 27-31 of general register 1 contain an unsigned binary integer (e.g., five bits) indicating the particular secondary arrival buffer summary group to contain summary indications. When any vector entry contained in the byte which contains the indicated vector entry, specified by register $R_2$, is set by the arrival and processing of a secondary command, the summary bit in the specified secondary arrival summary group will be set to one. When the token does not specify a coupling facility signaling vector, bits 0-31 of general register 1 are ignored.

Further details regarding the functions are described below:
Test Entry: The designated entry is tested. Condition code 0 is set if its value is, e.g., one. Condition code 1 is set if its value is, e.g., zero.
Load and Test Entries: Message vector entry values are loaded into the low-order half of register $R_2$+1. The value in the designated entry is placed in, e.g., bit 32. Successive entries are placed in successive bits until register bit 63 is reached, in one example.
The value in register $R_2$ is to have, e.g., five low-order zeros, designating, e.g., a 32-entry boundary. Condition code 0 is set if, e.g., all of the values loaded into register $R_2$+1 are one. Condition code 1 is set if any of the values are zero.

One or more special conditions may apply.

General register $R_2$+1 is unchanged if any special condition is recognized.

Condition code 2 is set if the LCEN/LNEN does not designate an entry in the vector.

Condition code 3 is set if the LCT/LNT is not assigned.

A specification exception is recognized if $R_1$ or $R_2$ is zero or odd, $R_1$ equals $R_2$, the value in, e.g., bits 32-63 of general register 1 exceeds, e.g., 1 hex, or the LCEN/LNEN for a load-and-test function does not have, e.g., five low-order zeros.

A specification exception is recognized when a LNT token contained in general register $R_1$ and $R_1$+1 specifies a coupling facility signaling vector and the function requested is load and test entries.

In one example, a specification exception is recognized when bit 0 of general register 1 is set to one and the value of select bits (e.g., bits 27-31) of general register 1 indicate an invalid value for the buffer summary group.

Example Resulting Condition Codes include, for instance:
0 Entry values all one
1 An entry value is zero
2 LCEN/LNEN too large
3 LCT/LNT not assigned In one or more aspects, the Test Vector Entries instruction is used to register the coupling facility signaling vector. It provides the ability to register a vector entry to particular buffer summary groups. In one example, the registration of the buffer summary group on the Test Vector Entries instruction is to occur before returning the state of the vector. On receipt of a secondary MCB to set any vector bit contained in a vector byte that has been registered, in one example, the central processor complex ensures the vector entry is set prior to the summary indication being set.

The coupling facility signaling vector may be unregistered via a Set Vector Entry instruction, described below. It unregisters a vector entry for one or more particular buffer summary groups.

Figure 6C:
FIG. 6C depicts one example of a format of a Set Vector Entry instruction, in accordance with one or more aspects of the present invention.

One example of the Set Vector Entry instruction to be used by the coupling facility to, e.g., unregister the coupling facility signaling vector is described with reference to FIG. 6C. In one example, a Set Vector Entry instruction 620 includes an operation code field 622 specifying a set vector operation, a first register field ($R_1$) 624 and a second register field ($R_2$) 626.

In one example, a designated message vector entry is set according to the value in, e.g., bits 32-63 of general register 1:

| Hex Value | Function Performed |
|---|---|
| 0000 0000 | Set entry to one |
| 0000 0001 | Reset entry to zero |

Bits 16-23 of the instruction are ignored, in one example.

The $R_1$ field designates an even-numbered register of an even-odd pair of general registers. The registers contain the local cache token (LCT) or list notification token (LNT) for the message vector. In one example, bits 0-31 of the local cache token or list notification token are contained in select bits (e.g., bits 32-63) of register $R_1$ and select bits (e.g., bits 32-63) of the local cache token or list notification token are contained in, e.g., bits 32-63 of register $R_1$+1.

The $R_2$ field designates a general register. The register contains the local cache entry number (LCEN) or list notification entry number (LNEN).

In one example, when the contents of registers $R_1$ and $R_1$+1 contain a previously defined coupling facility signaling vector token, bit 0 of general register 1, when set to one, indicates that a previous secondary-arrival summary group registration, if any, defined for the vector entry indicated in register $R_2$ by a previous Test Vector Entries instruction, is to be removed (de-registered). This will prevent any buffer summary group indication from being presented on any MCB arrival which designates any indicated vector entry in the previously registered byte. When the token does not indicate a valid coupling facility signaling vector token, bit 0 of general register 1 is ignored.

No list-notification-vector local or global summary is changed.

When any special condition is recognized, the vector is unchanged.

Condition code 2 is set if the LCEN/LNEN does not designate an entry in the vector.

Condition code 3 is set if the LCT/LNT is not assigned.

In one example, a specification exception is recognized when $R_1$ is odd or the value in, e.g., bits 32-63 of general register 1 exceeds, e.g., 1 hex.

Resulting Condition Codes include, as examples:
0 Vector entry set or reset
1 --
2 LCEN/LNEN too large
3 LCT/LNT not assigned One or more of the instructions described above are used in processing between, e.g., a processor and a coupling facility and/or between coupling facilities. One example of command processing between a processor and a coupling facility is a receive function at the coupling facility for a write command issued by the processor, an example of which is further described below.

In one example, a channel buffer is assigned to participate in receive functions when the Prepare Channel Buffer instruction is executed. The channel subsystem initiates a receive function when a command signal arrives at the channel buffer and the channel buffer is not status pending. Performing the receive function includes taking the following actions, as examples: storing command information and any accompanying data in main storage; when the coupling related adapter interruptions for shared engines facility is installed and enabled, recognizing a coupling-related adapter event; suspending the receive function to permit command processing by the program; resuming the receive function and sending response information and any accompanying data; and recognizing status conditions.

Figure 7A:
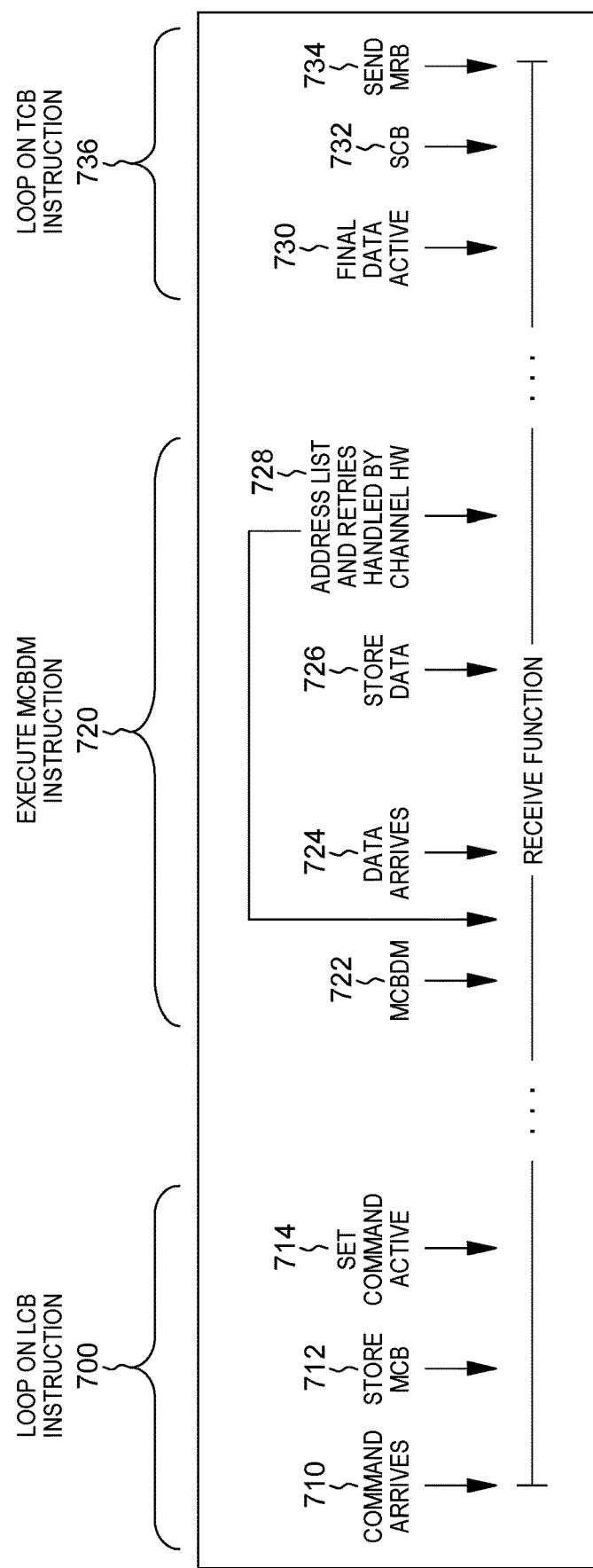
FIG. 7A depicts one example of command processing using primary recipient buffers.

One embodiment of receive function processing is described with reference to FIG. 7A. In one embodiment, the coupling facility polls on a system-wide basis looking for work to perform. The polling is performed by, for instance, looping 700 on an instruction, such as the Locate Channel Buffer instruction. When a command arrives 710 at the coupling facility and more particularly, when a command is received at a recipient channel buffer at the coupling facility, a receive function begins. The command information is stored 712 in a message command block using, for instance, a Store Message Command Block instruction or other instruction. The message command block area is located by, for instance, a channel buffer operation block pair address and the channel buffer number at the channel buffer. The parity of the channel buffer number determines whether an even or odd message command block area offset is used.

In one example, the message command block stored for the receive function includes, for instance:

Message time stamp: When the message time ordering indicator is, e.g., one, this field (e.g., bits 0-23 of word 1) includes the message time stamp.

Message facility domain number: This field (e.g., bits 24-31 of word 1) identifies the logical partition at the associated message facility on whose behalf the message processor operation is performed.

Command count: This field (e.g., bits 23-31 of word 2) specifies the number of meaningful words stored in the message command block.

STP message command: This field (e.g., bit 0 of word 3), when one, as an example, indicates that the command is an STP (server time protocol) message command. When this field is, e.g., zero, the command is a coupling facility or message facility command.

Transfer count: This field (e.g., bits 11-15 of word 3) specifies the transfer count. It is, for instance, an unsigned binary integer in the range of, e.g., 0-16. When the write indicator is, e.g., one, the transfer count specifies the number of message data blocks that are expected by the channel buffer; and when the write indicator is, e.g., zero, the transfer count specifies the maximum number of message data blocks that may be sent by the program.

Write indicator: This field (e.g., bit 16 of word 3) indicates a write operation when the indicator is set, e.g., to one; and it indicates a read operation when it is set, e.g., to zero.

Message time ordering: This field (e.g., bit 17 of word 3), when set, e.g., to one, indicates that the message header includes a message time stamp; and when set to, e.g., zero, the message header does not contain a message time stamp.

Transaction message size: This field (e.g., bit 18 of word 3) specifies the size of the message command block and the message response block. A value of, e.g., zero, indicates that the message command block and the message response block are both of a select size (e.g., 256 bytes). A value of, e.g., one, indicates that a message-1 command block and the message response block are both of another select size (e.g., 1024 bytes).

Transfer size: This field (e.g., bits 27-31 of word 3) specifies the size, in, e.g., 256-byte units, of each message data block. The transfer size is an unsigned binary integer in the range of, e.g., 0-16.

Command information: This field (e.g., words 4-255) includes values that complete the specification of the command.

The values in the message command block are valid when command active is indicated in the channel buffer; otherwise, the values in the message command block are undefined.

In addition to storing the MCB, the channel subsystem sets command active 714 at the channel buffer to indicate that the contents of the message command block are valid in main storage.

After a command arrives at the channel buffer, accompanying data is stored using, for instance, a Move Channel Buffer Data Multiple instruction 720. For instance, the Move Channel Buffer Data Multiple instruction is executed 722 based on a command (and accompanying data) arriving 724 and the data is stored 726 using the list of main addresses 728 provided on the Move Channel Buffer Data Multiple instruction.

When the amount of data requested on the Move Channel Buffer Data Multiple is greater than the amount of data received at the channel buffer, in one example, the data is extended with padding words of zero up to the amount of data requested.

When data is stored, it is moved from a list of main storage addresses provided on the Move Channel Buffer Data Multiple instruction. The channel subsystem sets final data active 730 at the channel buffer to indicate that the last message data block was sent successfully.

The receive function is completed, e.g., synchronously on a Signal Channel Buffer (SCB) instruction 732 that sends a message response block 734. In one example, the processing of setting the final data active indicator, completing the receive function and sending the message response block is performed based on a polling loop on a Test Channel Buffer instruction 736. For instance, the Test Channel Buffer instruction is executed which creates a channel buffer information block that resides in main storage, as an example. The channel buffer information block includes a data active control, which includes a final data active indicator. This indicator is checked and if it is set to indicate that the last message data block associated with the command has been sent, then the Signal Channel Buffer instruction is executed. Otherwise, the Test Channel Buffer instruction is executed again to check the final data active indicator.

In one example, response information is moved from the message response block area in main storage to the channel buffer. The message response block area is located by the channel buffer operation block pair address and the channel buffer number at the channel buffer. The parity of the channel buffer number determines whether the even or odd message response block area offset is used.

In one example, a message response block for a primary recipient buffer includes, for instance:

Response Count: This field (e.g., bits 21-31 of words 0) specifies the number of meaningful bytes stored in the message response block. The response count is an unsigned binary integer. It is a multiple of, e.g., four in a range of, e.g., 20-1024. The response count in words is to equal the length in the Signal Channel Buffer message operation word.

Last Path Used Mask: This field (e.g., bits 0-7 of word 1) is not meaningful to the receive function.

Data Count: This field (e.g., bits 15-23 of word 1) specifies the number of, e.g., 256-byte blocks stored in the message data blocks. The data count is an unsigned binary integer in a range of, e.g., 0-256. The data count is to be no larger than the product of the transfer size and the transfer count in the message command block. The data count is, e.g., zero, when the write indicator in the message command block is, e.g., one.

Response Time Indication: This field (e.g., bits 0-23 of word 2) includes the response time indication. When the response time indication qualifier is, e.g., zero, this field is set to zeros. When the response time indication qualifier is, e.g., one, this field includes, e.g., a 24-bit unsigned integer representing the amount of time the command was delayed by the message time ordering facility. The value in this field corresponds to select bits (e.g., bits 32-55) of a time-of-day clock, where the least significant bit represents, e.g., 0.0625 microsecond. When the response time indication qualifier is, e.g., 2, this field includes select bits (e.g., bits 32-35) of the local time-of-day clock when Signal Channel Buffer was executed. The response time indication is set when, e.g., the message time ordering facility is installed and message time ordering is requested, as indicated by the message time ordering indicator in the message header.

Response Time Indication Qualifier: This field (e.g., bits 24-25 of word 2) includes, e.g., an unsigned integer that indicates the contents of the response time indication field, as follows, in one example:

0 The response time indication is not meaningful

1 The response time indication includes the amount of time that the message was delayed by the receiver channel 2 The response time indication includes select bits (e.g., bits 32-35) of the time-of-day clock when Signal Channel Buffer was executed to complete the receive function.

3 Reserved

Link Attribute: This field (e.g., bit 26 of word 2) includes an indication of the link on which the response was received.

Duplexing Deactivated Indicator: The value of the duplexing deactivated indicator (e.g., bit 28 of word 2) describes the result of the single entry or list form duplexing process for duplexed commands.

Current Signal Group Index: When duplexing signals are issued for the command, the value of the current signal group index object in the signaling vector entry associated with the retry index is stored in this field (e.g., bits 30-31 of word 2). If duplexing signals are not generated for the command, zeros are stored in this field, as one example.

Response: This field (e.g., words 4-25) includes information summarizing the result of the operation.

Additional, fewer and/or other fields and/or values of the fields may be included.

After the response is set, the channel buffer is placed in the idle state and may be re-used.

Figure 7B:
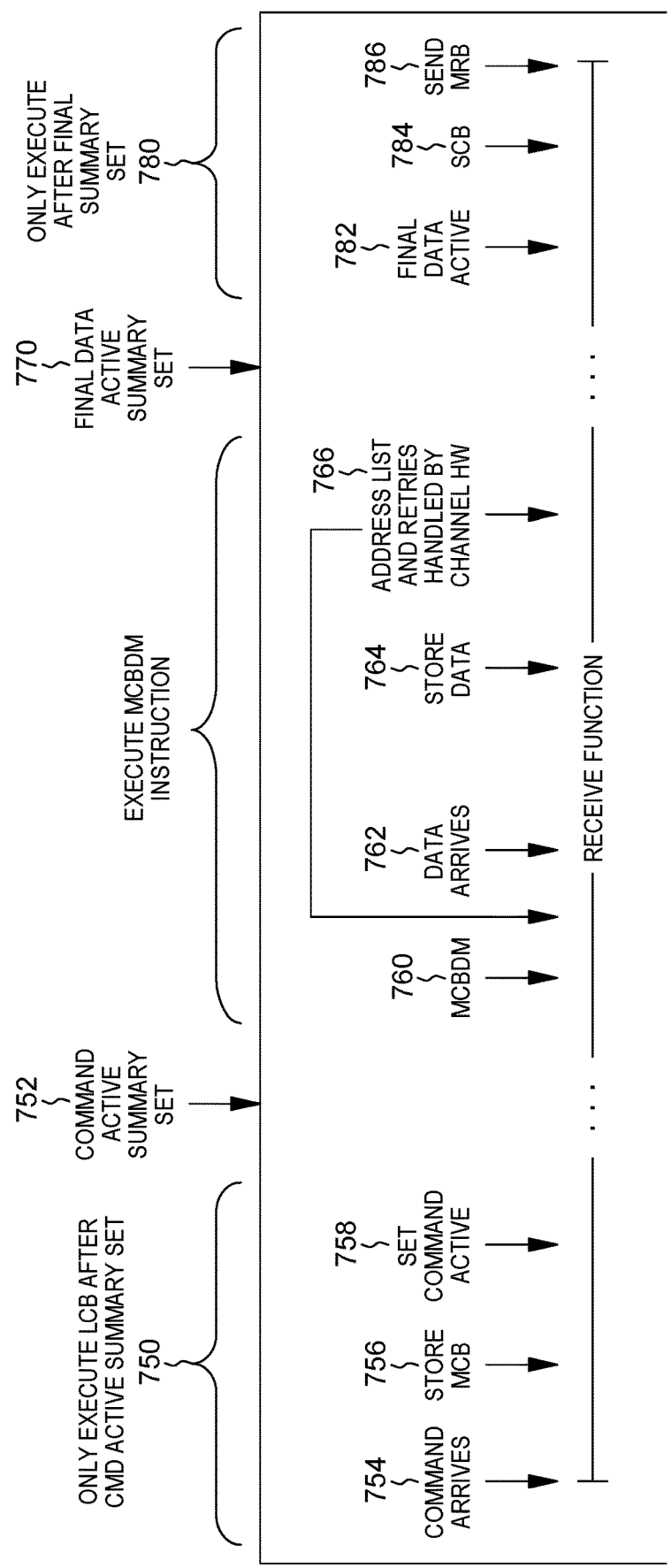
FIG. 7B depicts another example of command processing using primary recipient buffers, in accordance with one or more aspects of the present invention.

The polling for work (using, e.g., the Locate Channel Buffer instruction, as described above) is performed continually on a system-wide (e.g., configuration) basis. While polling allows for minimizing latency and total command processing time compared to interruption driven program context switching, it still takes time. Therefore, in accordance with one or more aspects of the present invention, instead of polling on a system-wide basis, polling is performed on individual buffer summary groups. For instance, the buffers are divided into a plurality of buffer summary groups (in one example, up to 32 groups, but in other embodiments, there may be additional or fewer groups). In one example, the coupling facility controls the assigning of buffers (at least select buffers, such as primary recipient buffers) to buffer summary groups. The coupling facility is aware of the configuration topology for processor selection and affinity to groups. The system (e.g., architecture—such as the firmware) provides the ability to summarize coupling facility state changes for processing within each group and separate from other groups, improving polling efficiency. As an example, the assigning is based, for instance, on usage of the buffers by processors. In one example, processors that are in close physical proximity will share buffers and those buffers will be assigned to a same buffer summary group. This facilitates maintaining data in the caches, reducing latency in refreshing the caches. Further details regarding processing of a primary recipient buffer in which polling is limited are described with reference to FIG. 7B.

In accordance with one or more aspects, instead of polling on the Locate Channel Buffer instruction, the Locate Channel Buffer instruction is executed 750 only after, e.g., a command active summary indicator of a buffer summary group is set 752. For instance, the command active summary bit is checked (e.g., directly without needing to execute an architected instruction) and if it is set, then the Locate Channel Buffer instruction is executed for the buffers associated with the buffer summary group having the set indicator. Based on determining there is work to be performed in one of the buffers of the buffer summary group, that is, a command has arrived 754, a message command block is stored 756 and a command active indicator is set 758. Thereafter, as described above, the data that has arrived is moved. For instance, a Move Control Block Data Multiple instruction is executed 760 when the data arrives 762 and the data is stored 764. As before, address list and retries are handled by, e.g., the channel hardware 766. Thereafter, in accordance with one or more aspects of the present invention, a final data active summary indicator 770 is set in the corresponding buffer summary group. For instance, channels that require, e.g., all data to be received at the channel buffer prior to the Move Channel Buffer Data Multiple instruction completing with condition code 0 and synchronously moving the command data, the final data active/data ready summary bit in the channel buffer summary response area for the buffer summary group number defined at the Prepare Channel Buffer instruction time is set to one when all data for the command has arrived at the channel buffer.

The channel subsystem sets final data active 782 at the channel buffer to indicate that the contents of the message data block are valid in main storage and it is the last message data block associated with the command. For channels that do not require, e.g., all data to be received at the channel buffer prior to execution of the Move Channel Buffer Data Multiple instruction, the final data active/data ready summary bit in the channel buffer summary response area for the buffer summary group number defined at Prepare Channel Buffer instruction time is also set to one when all data for the command is valid in main storage.

Based on the summary indicator being set 780, final data active indicator is set 782, a Signal Channel Buffer instruction is executed 784 and the response is sent 786.

Therefore, in accordance with one or more aspects of the present invention, in a particular execution, the Locate Channel Buffer instruction is limited to a selected buffer summary group, and polling of the LCB is replaced with checking a summary indicator (e.g., command active summary indicator) to determine whether the buffers of the selected buffer summary group are to be checked for work. The Locate Channel Buffer instruction is executed based on a confirmed state change, saving latency and improving processing speed. In a further aspect, when there is no indication that the work has arrived, the Locate Channel Buffer may be executed for all buffers of the configuration, as before to ensure no loss of messages.

Further, in one or more aspects, the use of vectors to determine whether an event has occurred is facilitated. A coupling facility uses a vector, which is for instance, an array of bits to indicate certain events and/or to determine certain events have occurred. For example, one coupling facility may set a vector bit to indicate that it is at a certain point in processing and another coupling facility which is, for instance, being used for duplexing of the other coupling facility (e.g., maintaining a second copy of data and/or coupling facility structures) may check the vector bit to ensure that they are at the same point. There are also other types of events that may be indicated by using a vector.

The use of a vector is facilitated, in one or more aspects of the present invention, by using buffer summary groups and summary indicators to reduce latency and improve processing speed. Since the vector is not directly accessible to the coupling facility but instead is accessible via executing an instruction, such as a Test Vector Entries instruction, processing is improved by limiting execution of the instruction based on a summary indicator indicating that a change to a vector entry has occurred. Polling on the vector using one or more instructions is not necessarily needed but may be provided, if desired, in certain circumstances.

One or more aspects of the present invention are inextricably tied to computer technology and facilitate processing within a computer, improving performance thereof. By providing buffer summary groups and assigning certain buffers (and therefore, certain processors) to the buffers summary groups, events may be detected by checking summary indicators of the buffer summary groups rather than performing polling, which reduces latency and use of system resources and improves processing speed.

Further details of one embodiment of facilitating processing within a computing environment, as it relates to one or more aspects of the present invention, are described with reference to FIGS. 8A-8B.

Referring to FIG. 8A, in one embodiment, a vector entry of a signaling vector is registered to a buffer summary group 800. The buffer summary group includes one or more summary indicators for one or more buffers assigned to the buffer summary group 802. A command is processed that sets a vector indicator in the vector entry 804, and in one example, based on setting the vector indicator in the vector entry, a summary indicator of the one or more summary indicators is set in the buffer summary group 806.

Using the buffer summary group to indicate that a vector entry has been updated facilitates processing, reduces system resources and improves processing speed by reducing the number of instructions (e.g., architected instructions) to be executed to check the vector entry.

In one example, the registering includes using a test vector entries instruction to register the vector entry to the buffer summary group 808. Further, in one example, the vector entry is unregistered from the buffer summary group 810. The unregistering includes, for instance, using a set vector entry instruction to unregister the vector entry from the buffer summary group 812.

In one example, the signaling vector is defined, and the signaling vector is to be used by a coupling facility of the computing environment in communication with another coupling facility of the computing environment 814.

In one example, referring to FIG. 8B, the one or more buffers assigned to the buffer summary group include one or more recipient secondary buffers used by one coupling facility of the computing environment to receive communications from another coupling facility of the computing environment 820. As an example, the one or more buffers are assigned to the buffer summary group 822, in which the assigning includes, for instance, using a prepare channel buffer instruction to assign the one or more buffers to the buffer summary group 824. The prepare channel buffer instruction is executed, in one example, prior to defining the signaling vector 826.

As an example, the registering, processing and setting are performed by a coupling facility of the computing environment, the coupling facility to facilitate coupling of multiple processors of the computing environment 828.

Other variations and embodiments are possible.

In one or more aspects, buffer operations and new state change indications may be separated into multiple buffer summary groups, which are a subset of the configuration wide facility. Recipient buffers, as an example, are associated with a specific buffer summary group at, for instance, Prepare Channel Buffer instruction time, and originator buffers are associated with a specific buffer summary group at each Send Message instruction time or Signal Channel Buffer instruction time. A detection of a command received (e.g., Locate Channel Buffer instruction) can be limited to particular buffers assigned to a specified buffer summary group. This allows work to be found and distributed to selected processors keeping a subset of processors assigned to a buffer summary group.

In one or more aspects, a summary indication is provided for a command received on a buffer assigned to a specific buffer summary group, which allows the removal of polling on the Locate Channel Buffer instruction. Further, a summary indication of state changes to buffers assigned to a specific summary group is provided, which limits polling to, for instance, only active buffers assigned to a buffer summary group with an assurance of at least one requiring processing. Program polling is, for instance, limited to a single indication and to evaluation e.g., only when a change occurs. In one example, program evaluation is used to determine the specific buffer(s) that encountered the state change, assuming there may be more than one buffer.

In one or more aspects, a summary indication for registered vector state changes to a specified buffer summary group is provided. This limits polling to, e.g., only active vectors assigned to a buffer summary group with an assurance of at least one requiring processing.

In one or more aspects, performance measurements are provided that include, for instance, the buffer summary group assigned to a processor and/or a specification of the number of commands initiated by the processor. Additional, fewer and/or other performance measurement information may also be provided.

Figure 9A:
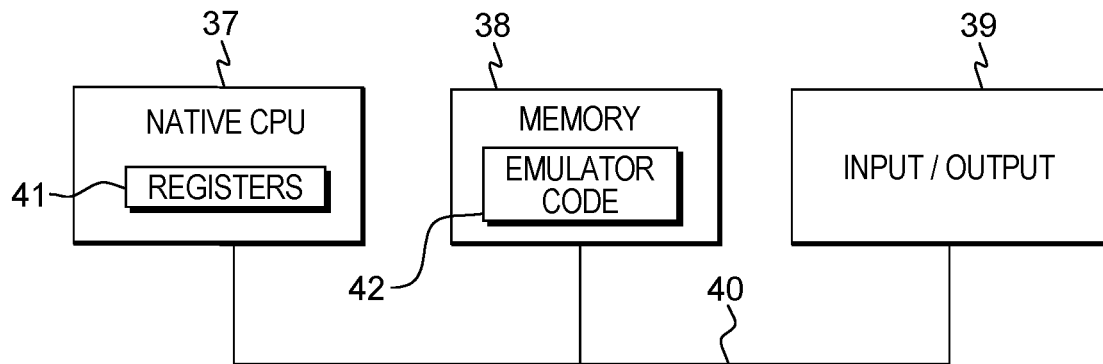
FIG. 9A depicts another example of a computing environment to incorporate and use one or more aspects of the present invention.

Aspects of the present invention may be used by many types of computing environments. Another embodiment of a computing environment to incorporate and use one or more aspects of the present invention is described with reference to FIG. 9A. In this example, a computing environment 36 includes, for instance, a native central processing unit (CPU) 37, a memory 38, and one or more input/output devices and/or interfaces 39 coupled to one another via, for example, one or more buses 40 and/or other connections. As examples, computing environment 36 may include a PowerPC® processor offered by International Business Machines Corporation, Armonk, New York; an HP Superdome with HP Superdome with Intel® Itanium® II processors offered by Hewlett Packard Co., Palo Alto, California; and/or other machines based on architectures offered by International Business Machines Corporation, Hewlett Packard, Intel Corporation, Oracle, and/or others. PowerPC is a trademark or registered trademark of International Business Machines Corporation in at least one jurisdiction. Intel and Itanium are trademarks or registered trademarks of Intel Corporation or its subsidiaries in the United States and other countries.

Native central processing unit 37 includes one or more native registers 41, such as one or more general purpose registers and/or one or more special purpose registers used during processing within the environment. These registers include information that represents the state of the environment at any particular point in time.

Moreover, native central processing unit 37 executes instructions and code that are stored in memory 38. In one particular example, the central processing unit executes emulator code 42 stored in memory 38. This code enables the computing environment configured in one architecture to emulate another architecture. For instance, emulator code 42 allows machines based on architectures other than the z/Architecture instruction set architecture, such as PowerPC processors, HP Superdome servers or others, to emulate the z/Architecture instruction set architecture and to execute software and instructions developed based on the z/Architecture instruction set architecture.

Figure 9B:
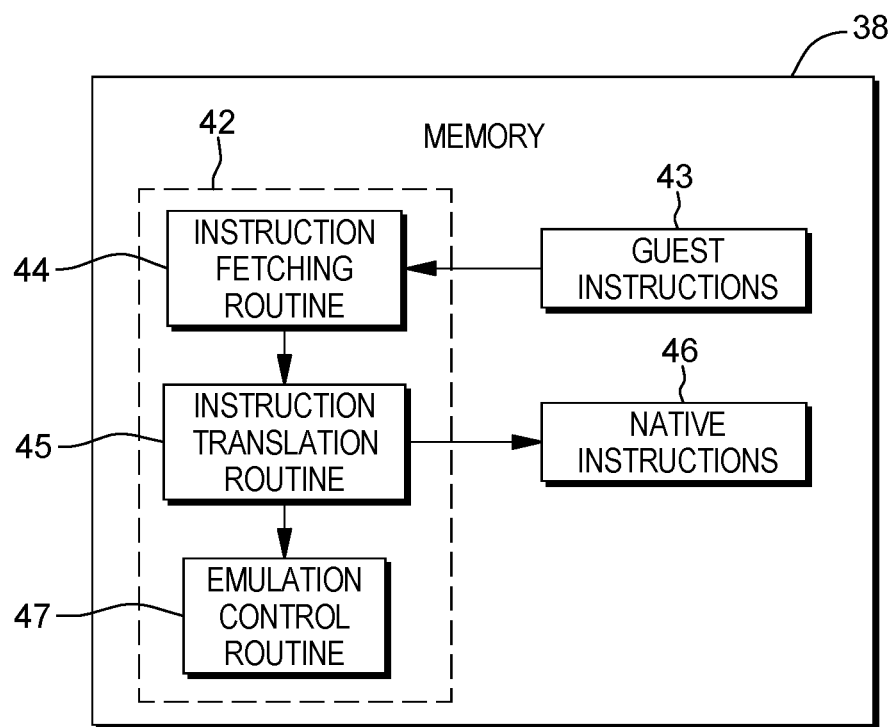
FIG. 9B depicts further details of the memory of FIG. 9A, in accordance with one or more aspects of the present invention.

Further details relating to emulator code 42 are described with reference to FIG. 9B. Guest instructions 43 stored in memory 38 comprise software instructions (e.g., correlating to machine instructions) that were developed to be executed in an architecture other than that of native CPU 37. For example, guest instructions 43 may have been designed to execute on a processor based on the z/Architecture instruction set architecture, but instead, are being emulated on native CPU 37, which may be, for example, an Intel Itanium II processor. In one example, emulator code 42 includes an instruction fetching routine 44 to obtain one or more guest instructions 43 from memory 38, and to optionally provide local buffering for the instructions obtained. It also includes an instruction translation routine 45 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 42 includes an emulation control routine 47 to cause the native instructions to be executed. Emulation control routine 47 may cause native CPU 37 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 46 may include loading data into a register from memory 38; storing data back to memory from a register; or performing some type of arithmetic or logic operation, as determined by the translation routine.

Each routine is, for instance, implemented in software, which is stored in memory and executed by native central processing unit 37. In other examples, one or more of the routines or operations are implemented in firmware, hardware, software or some combination thereof. The registers of the emulated processor may be emulated using registers 41 of the native CPU or by using locations in memory 38. In embodiments, guest instructions 43, native instructions 46 and emulator code 42 may reside in the same memory or may be disbursed among different memory devices.

An instruction that may be emulated includes the instructions described herein, in accordance with one or more aspects of the present invention. Further, other instructions, commands, functions, operations and/or one or more aspects of the present invention may be emulated, in accordance with one or more aspects of the present invention.

The computing environments described above are only examples of computing environments that can be used. Other environments, including but not limited to, non-partitioned environments, partitioned environments, cloud environments and/or emulated environments, may be used; embodiments are not limited to any one environment. Although various examples of computing environments are described herein, one or more aspects of the present invention may be used with many types of environments. The computing environments provided herein are only examples.

Each computing environment is capable of being configured to include one or more aspects of the present invention.

One or more aspects may relate to cloud computing.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
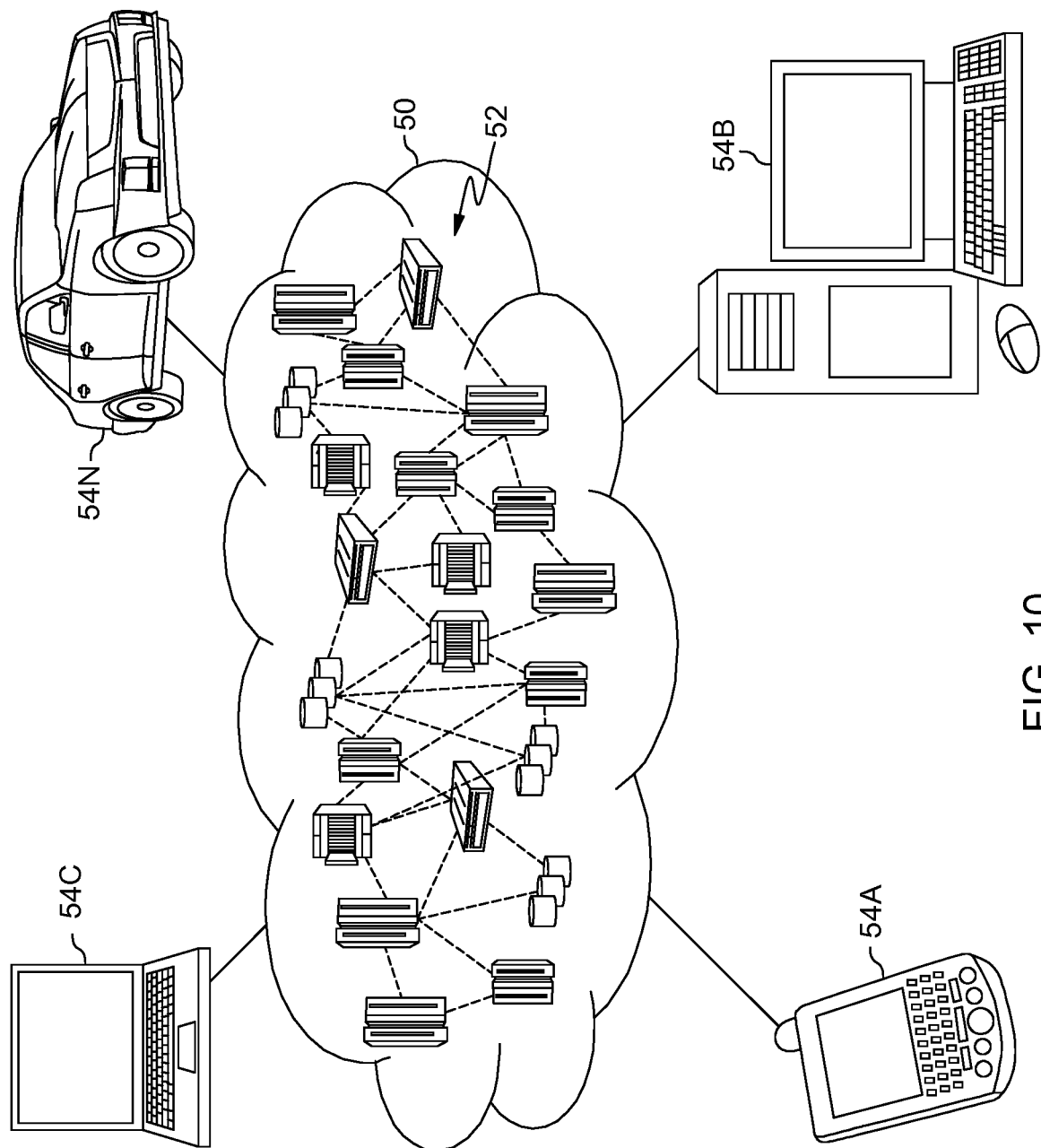
FIG. 10 depicts one embodiment of a cloud computing environment, in accordance with one or more aspects of the present invention.

Referring now to FIG. 10, illustrative cloud computing environment 50 is depicted. As shown, cloud computing environment 50 includes one or more cloud computing nodes 52 with which local computing devices used by cloud consumers, such as, for example, personal digital assistant (PDA) or cellular telephone 54A, desktop computer 54B, laptop computer 54C, and/or automobile computer system 54N may communicate. Nodes 52 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 52 and cloud computing environment 50 can communicate with any type of computerized device over any type of network and/or network addressable connection (e.g., using a web browser).

Figure 11:
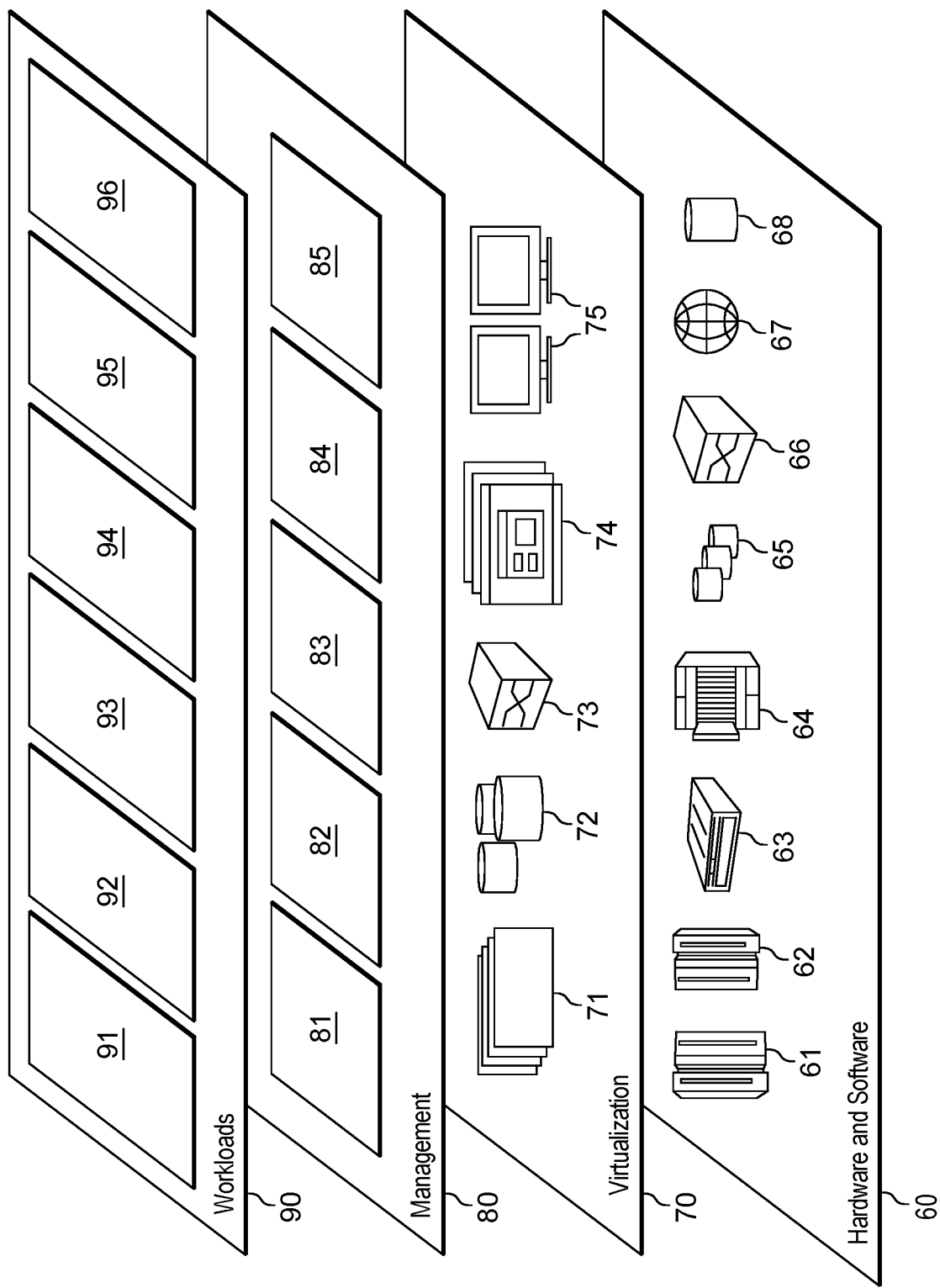
FIG. 11 depicts one example of abstraction model layers, in accordance with one or more aspects of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and buffer summary group processing 96.

Aspects of the present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For instance, computing environments of other architectures can be used to incorporate and/or use one or more aspects. Further, different instructions, functions and/or operations may be used. Additionally, different types of registers and/or different registers may be used. Many variations are possible.

Various aspects are described herein. Further, many variations are possible without departing from a spirit of aspects of the present invention. It should be noted that, unless otherwise inconsistent, each aspect or feature described herein, and variants thereof, may be combinable with any other aspect or feature.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a computing environment, the computer program product comprising:
   one or more computer readable storage media and program instructions collectively stored on the one or more computer readable storage media to perform a method comprising:
   registering a vector entry of a signaling vector to a buffer summary group, the signaling vector to be used in communication between one system and another system external to the one system, the buffer summary group including one or more summary indicators for one or more buffers assigned to the buffer summary group;
   processing a command that sets a vector indicator in the vector entry; and
   setting a summary indicator of the one or more summary indicators in the buffer summary group, based on setting the vector indicator in the vector entry, the summary indicator that is set in the buffer summary group indicating a change has occurred to the vector entry.

2. The computer program product of claim 1, wherein the registering includes using a test vector entries instruction to register the vector entry to the buffer summary group.

3. The computer program product of claim 1, wherein the method further comprises unregistering the vector entry from the buffer summary group.

4. The computer program product of claim 3, wherein the unregistering includes using a set vector entry instruction to unregister the vector entry from the buffer summary group.

5. The computer program product of claim 1, wherein the method further comprises defining the signaling vector, the signaling vector to be used by a coupling facility of the computing environment in communication with another coupling facility of the computing environment.

6. The computer program product of claim 1, wherein the one or more buffers assigned to the buffer summary group include one or more recipient secondary buffers used by one coupling facility of the computing environment to receive communications from another coupling facility of the computing environment.

7. The computer program product of claim 1, wherein the method further comprises assigning the one or more buffers to the buffer summary group.

8. The computer program product of claim 7, wherein the assigning the one or more buffers to the buffer summary group includes using a prepare channel buffer instruction to assign the one or more buffers to the buffer summary group.

9. The computer program product of claim 8, wherein the prepare channel buffer instruction is executed prior to defining the signaling vector.

10. The computer program product of claim 1, wherein the registering, processing and setting are performed by a coupling facility of the computing environment, the coupling facility to facilitate coupling of multiple processors of the computing environment.

11. A computer system for facilitating processing within a computing environment, the computer system comprising:
    a memory; and
    at least one processor in communication with the memory, wherein the computer system is configured to perform a method, said method comprising:
    registering a vector entry of a signaling vector to a buffer summary group, the signaling vector to be used in communication between one system and another system external to the one system, the buffer summary group including one or more summary indicators for one or more buffers assigned to the buffer summary group;
    processing a command that sets a vector indicator in the vector entry; and
    setting a summary indicator of the one or more summary indicators in the buffer summary group, based on setting the vector indicator in the vector entry, the summary indicator that is set in the buffer summary group indicating a change has occurred to the vector entry.

12. The computer system of claim 11, wherein the method further comprises unregistering the vector entry from the buffer summary group.

13. The computer system of claim 11, wherein the method further comprises defining the signaling vector, the signaling vector to be used by a coupling facility of the computing environment in communication with another coupling facility of the computing environment.

14. The computer system of claim 11, wherein the method further comprises assigning the one or more buffers to the buffer summary group, the assigning the one or more buffers to the buffer summary group including using a prepare channel buffer instruction to assign the one or more buffers to the buffer summary group.

15. The computer system of claim 14, wherein the prepare channel buffer instruction is executed prior to defining the signaling vector.

16. A computer-implemented method of facilitating processing within a computing environment, the computer-implemented method comprising:

registering a vector entry of a signaling vector to a buffer summary group, the signaling vector to be used in communication between one system and another system external to the one system, the buffer summary group including one or more summary indicators for one or more buffers assigned to the buffer summary group;

processing a command that sets a vector indicator in the vector entry; and setting a summary indicator of the one or more summary indicators in the buffer summary group, based on setting the vector indicator in the vector entry, the summary indicator that is set in the buffer summary group indicating a change has occurred to the vector entry.

17. The computer-implemented method of claim 16, further comprising unregistering the vector entry from the buffer summary group.

18. The computer-implemented method of claim 16, further comprising defining the signaling vector, the signaling vector to be used by a coupling facility of the computing environment in communication with another coupling facility of the computing environment.

19. The computer-implemented method of claim 16, further comprising assigning the one or more buffers to the buffer summary group.

20. The computer-implemented method of claim 19, wherein the assigning the one or more buffers to the buffer summary group includes using a prepare channel buffer instruction to assign the one or more buffers to the buffer summary group.

21. The computer-implemented method of claim 20, wherein the prepare channel buffer instruction is executed prior to defining the signaling vector.

22. The computer-implemented method of claim 16, wherein the one or more buffers assigned to the buffer summary group include one or more recipient secondary buffers used by one coupling facility of the computing environment to receive communications from another coupling facility of the computing environment.

23. The computer program product of claim 1, wherein the registering the vector entry of the signaling vector to the buffer summary group uses an instruction of an instruction set architecture.

24. A computer program product for facilitating processing within a computing environment, the computer program product comprising:

one or more computer readable storage media and program instructions collectively stored on the one or more computer readable storage media to perform a method comprising:

assigning one or more buffers to a buffer summary group, the assigning the one or more buffers to the buffer summary group including using a prepare channel buffer instruction to assign the one or more buffers to the buffer summary group, and wherein the buffer summary group includes one or more summary indicators for the one or more buffers assigned to the buffer summary group;

registering a vector entry of a signaling vector to the buffer summary group, wherein the prepare channel buffer instruction is executed prior to defining the signaling vector;

processing a command that sets a vector indicator in the vector entry; and setting a summary indicator of the one or more summary indicators in the buffer summary group, based on setting the vector indicator in the vector entry.

25. A computer-implemented method of facilitating processing within a computing environment, the computer-implemented method comprising:

assigning one or more buffers to a buffer summary group, the assigning the one or more buffers to the buffer summary group including using a prepare channel buffer instruction to assign the one or more buffers to the buffer summary group, and wherein the buffer summary group includes one or more summary indicators for the one or more buffers assigned to the buffer summary group;

registering a vector entry of a signaling vector to the buffer summary group, wherein the prepare channel buffer instruction is executed prior to defining the signaling vector;

processing a command that sets a vector indicator in the vector entry; and setting a summary indicator of the one or more summary indicators in the buffer summary group, based on setting the vector indicator in the vector entry.

* * * * *